(12) United States Patent
Nagayama

(10) Patent No.: US 12,543,933 B2
(45) Date of Patent: Feb. 10, 2026

(54) BENDING TUBE OF ENDOSCOPE, ENDOSCOPE, AND MANUFACTURING METHOD FOR BENDING TUBE OF ENDOSCOPE

(71) Applicant: OLYMPUS MEDICAL SYSTEMS CORP., Tokyo (JP)

(72) Inventor: Norimitsu Nagayama, Hino (JP)

(73) Assignee: Olympus Medical Systems Corp., Tokyo (JP)

( * ) Notice: Subject to any disclaimer, the term of this patent is extended or adjusted under 35 U.S.C. 154(b) by 355 days.

(21) Appl. No.: 18/238,000

(22) Filed: Aug. 25, 2023

(65) Prior Publication Data

US 2024/0081626 A1  Mar. 14, 2024

Related U.S. Application Data

(60) Provisional application No. 63/404,559, filed on Sep. 8, 2022.

(51) Int. Cl.
*A61B 1/00* (2006.01)
*A61B 1/008* (2006.01)
*A61B 1/01* (2006.01)

(52) U.S. Cl.
CPC ............... *A61B 1/008* (2013.01); *A61B 1/01* (2013.01)

(58) Field of Classification Search
CPC ..... A61B 1/0011; A61B 1/0051; A61B 1/008; A61B 1/0055; A61B 1/00071
See application file for complete search history.

(56) References Cited

U.S. PATENT DOCUMENTS 8,939,899 B2  1/2015  Kitagawa et al.

FOREIGN PATENT DOCUMENTS

| JP | 2554092 B2 | 11/1996 |
|----|------------|---------|
| JP | 2006-312194 A | 11/2006 |
| JP | 2010-252859 A | 11/2010 |
| JP | 5404154 B2 | 1/2014 |
| JP | 2014-108171 A | 6/2014 |

*Primary Examiner* — Timothy J Neal
(74) *Attorney, Agent, or Firm* — Morgan, Lewis & Bockius LLP

(57) ABSTRACT

A bending tube includes a first tubular member including a first tubular opening and a second tubular member including a second tubular opening. The first tubular member includes a first end portion, a first hole, and a projection on a surface of the first end portion around a periphery of a first end of the first hole. The second tubular member includes a second end portion, a second hole, and a turning shaft projecting from a periphery of a first end of the second hole. The first end portion overlaps the second end portion and the turning shaft is seated in the first hole to connect the first tubular member to the second tubular member. The projection on the surface of the first end portion contacts a surface of the second end portion.

17 Claims, 32 Drawing Sheets

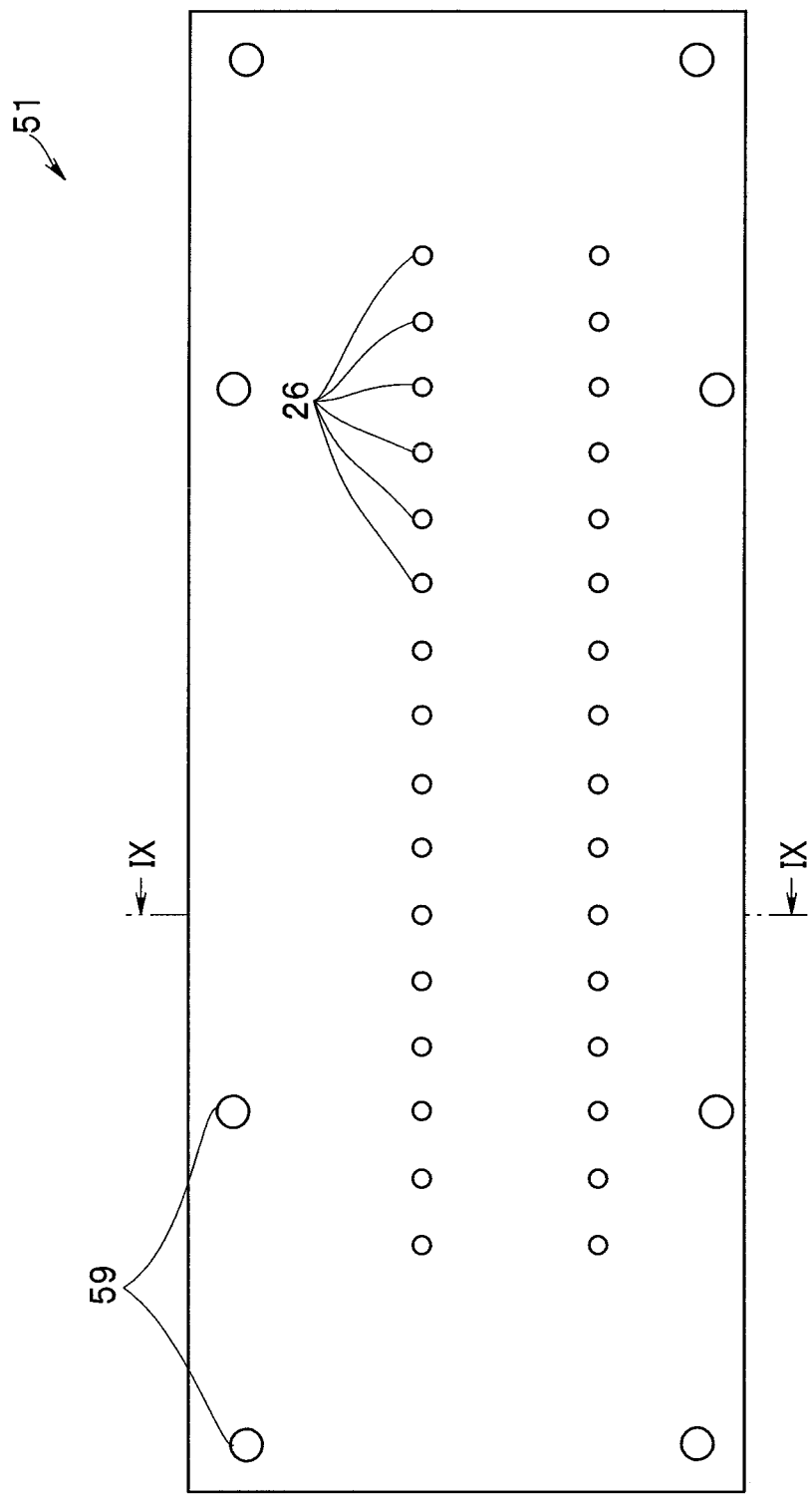

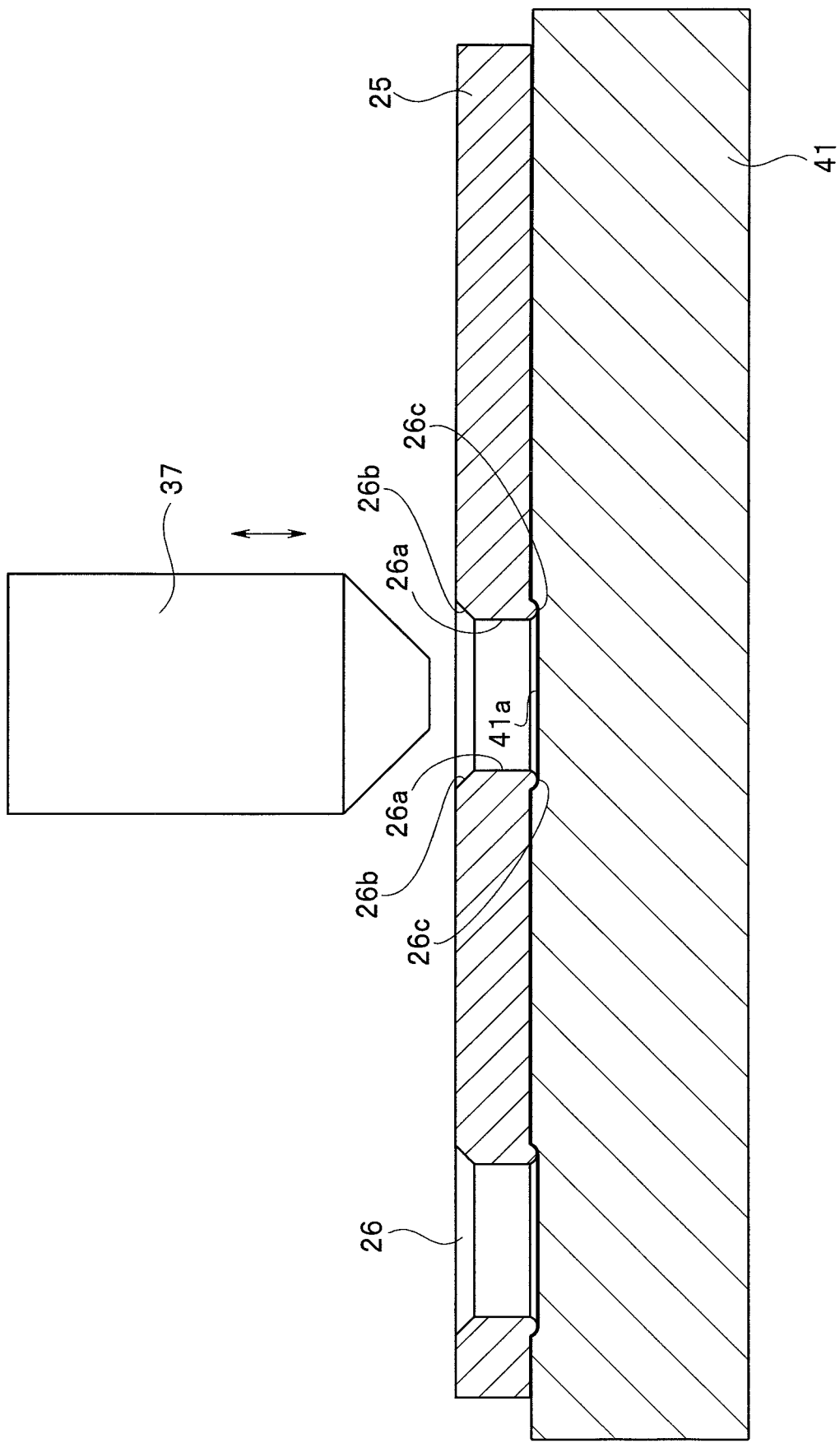

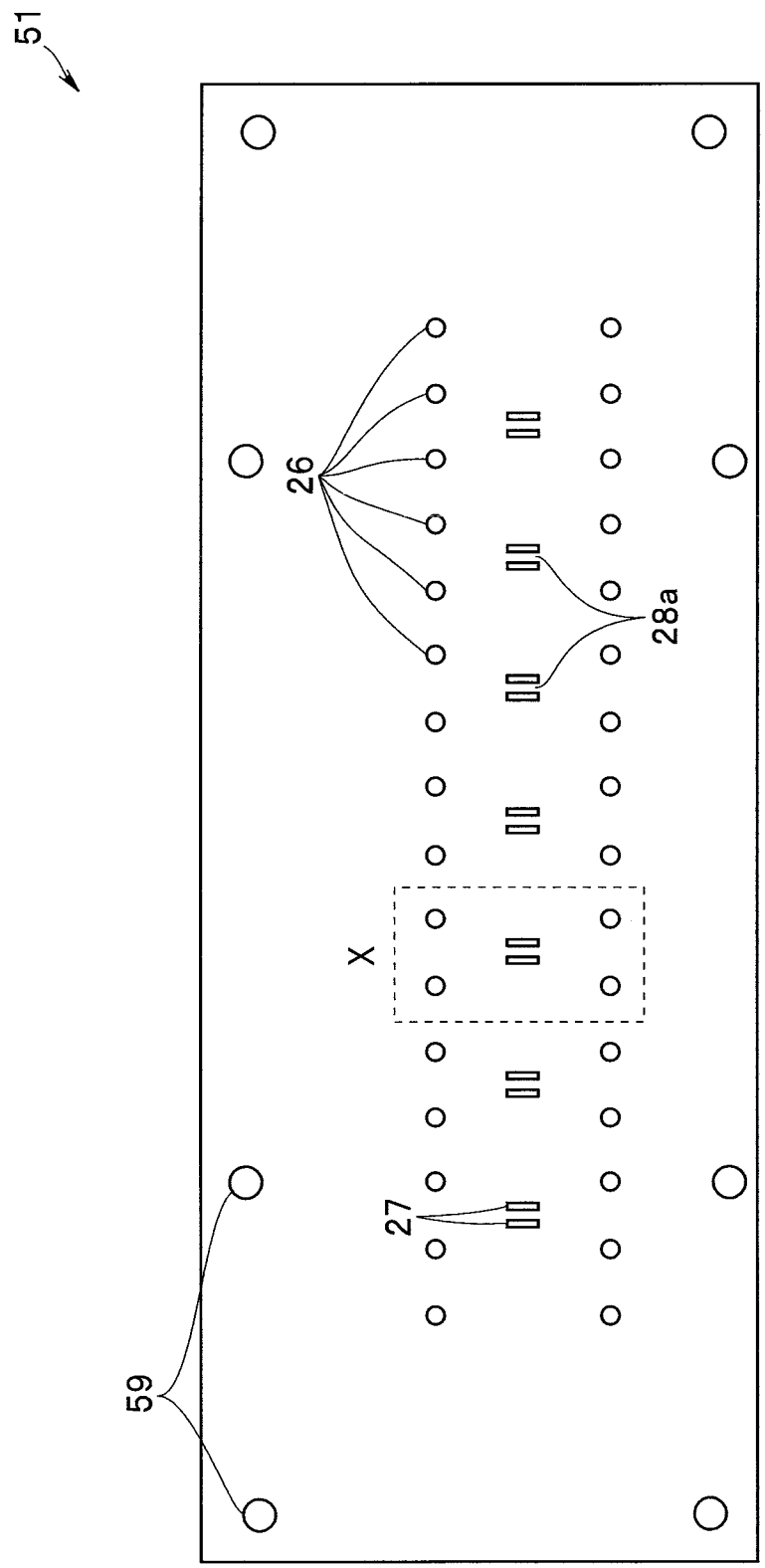

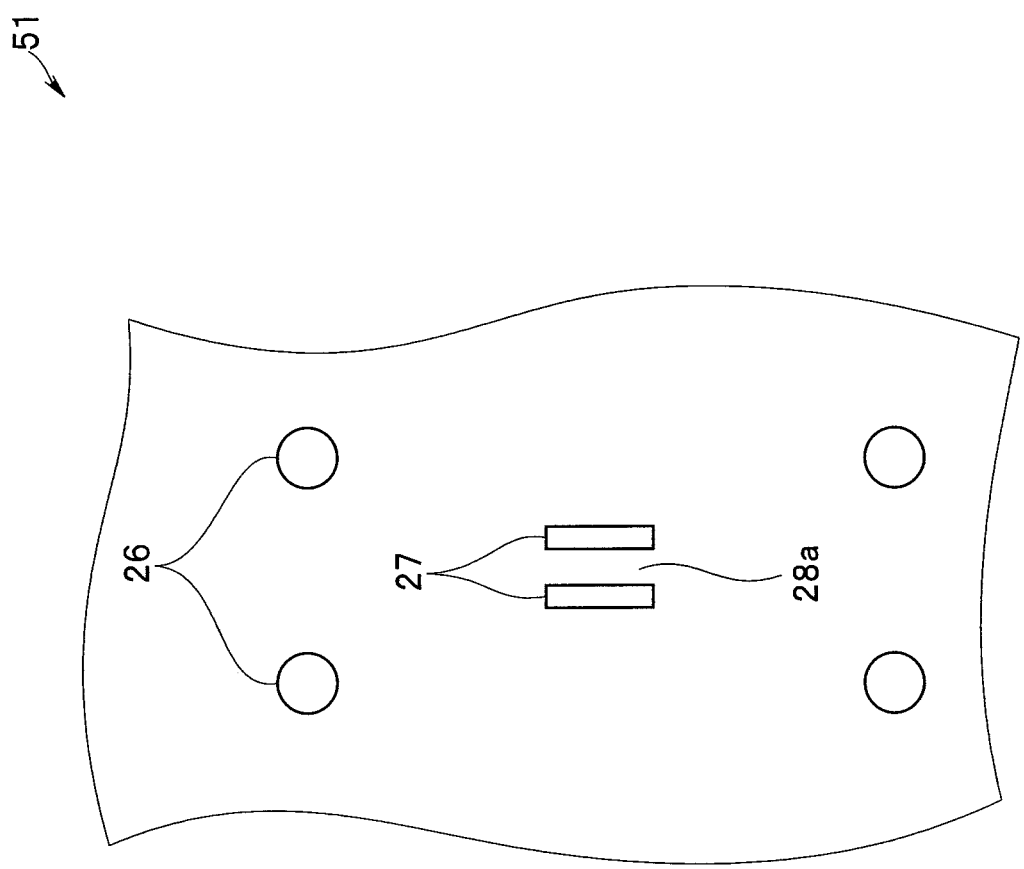

BENDING TUBE OF ENDOSCOPE, ENDOSCOPE, AND MANUFACTURING METHOD FOR BENDING TUBE OF ENDOSCOPE

RELATED APPLICATION DATA

This application is based on and claims priority under 35 U.S.C. § 119 to U.S. Provisional Application No. 63/404,559 filed on Sep. 8, 2022, the entire contents of which are incorporated herein by reference.

BACKGROUND

The present disclosure relates to a bending tube of an endoscope in which a plurality of tubular members are turnably coupled, the endoscope, and a manufacturing method for the bending tube of the endoscope.

An insertion section is inserted into an inside of a subject such as an inside of a body cavity or an inside of a conduit, whereby an endoscope is capable of performing observation of the inside of the subject, various treatments for the inside of the subject, and the like.

In general, a bending portion bendable in a plurality of directions is provided on a distal end side of an insertion section of an endoscope. In the bending portion, a bending tube including a plurality of bending pieces (tubular members) is widely used. The plurality of bending pieces configuring the bending tube are disposed in a longitudinal direction of the bending portion. Further, the respective bending pieces adjacent to one another are turnably coupled in a state in which the bending pieces are partially superimposed. Rivet bonding or the like can be used for the coupling of the bending pieces.

The bending portion configured in this way can be bent in, for example, up and down and left and right four directions by an operation wire (a bending wire) inserted through an inside of the bending tube.

As an endoscope for improving operability of such a bending portion, various techniques have been proposed. For example, Japanese Patent Application Laid-Open Publication No. 2014-108171 discloses a technique for avoiding interference between a rivet member and a bending wire guide member by restricting a position of the bending wire guide member according to a distance from a center of a bending piece to an inner circumferential surface of a connection piece pipe sleeve portion and a distance from the center of the bending piece to an inner circumferential surface of a connection pipe sleeve.

SUMMARY

A bending tube for an endoscope according to an aspect of the present disclosure includes: a first tubular member including a first tubular opening extending in an axial direction of the first tubular member from a first tubular end to a second tubular end and a second tubular member including a second tubular opening extending in an axial direction of the second tubular member from a first tubular end to a second tubular end, wherein the first tubular member includes a first end portion, a first hole extending through the first end portion in a radial direction of the first tubular member, and a projection on a surface of the first end portion around a periphery of a first end of the first hole, and wherein the second tubular member includes a second end portion, a second hole extending through the second end portion in a radial direction of the second tubular member, and a turning shaft projecting from a periphery of a first end of the second hole, wherein the first end portion overlaps the second end portion and the turning shaft is seated in the first hole to connect the first tubular member to the second tubular member, and wherein, with the turning shaft seated in the first hole: the first tubular member is turnable relative to the second tubular member about a shaft axis of the turning shaft, and the projection on the surface of the first end portion contacts a surface of the second end portion.

An endoscope according to an aspect of the present disclosure includes a bendable bending portion in an insertion section, wherein the bending portion includes the bending tube according to a first aspect.

A manufacturing method for a bending tube of an endoscope according to an aspect of the present disclosure includes: forming, in a first plate material, a first hole having an inner diameter; forming, on a first surface of the first plate material, a projection around a periphery of a first end of the first hole; forming, in a second plate material, a turning shaft configured to be insertable into the first hole, wherein the turning shaft includes a second hole extending through the turning shaft in an axial direction of the turning shaft; inserting the turning shaft into the first hole; working a distal end portion of the turning shaft to increase an outer diameter of the distal end portion to be larger than the inner diameter of the first hole; and forming the first plate material into a first tubular member and forming the second plate material into a second tubular member.

BRIEF DESCRIPTION OF THE DRAWINGS

FIG. 9A is a plan view showing a state after a first boring process for a first plate material was performed.
FIG. 9B is a IX-IX sectional view of FIG. 9A showing a state after a punching process was performed.
FIG. 10A is a plan view showing a state after a second boring process for the first plate material was performed.
FIG. 10B is an enlarged plan view showing a range X in FIG. 10A.

DETAILED DESCRIPTION

In general, when bending pieces are coupled using rivet bonding or the like, it is necessary to plastically work end portions of the rivets in portions where the bending pieces are superimposed.

Sliding resistance of such coupling portions is easily affected by a press load and the like during the plastic working. Therefore, a skilled technique and the like of an operator are required for work for coupling the bending pieces without increasing the sliding resistance of the coupling portions.

According to an embodiment explained below, it is possible to reduce sliding resistance between tubular members without relying on a technique and the like of a manufacturing operator.

A mode of the present disclosure is explained below with reference to the drawings.

Note that in the figures used for the following explanation, some scales are differentiated for each of components in order to show the respective components in recognizable sizes on the drawings. Therefore, the present disclosure is not limited by only quantities of the components, shapes of the components, ratios of sizes of the components, and relative positional relations among the respective components described in the figures.

Figure 1:
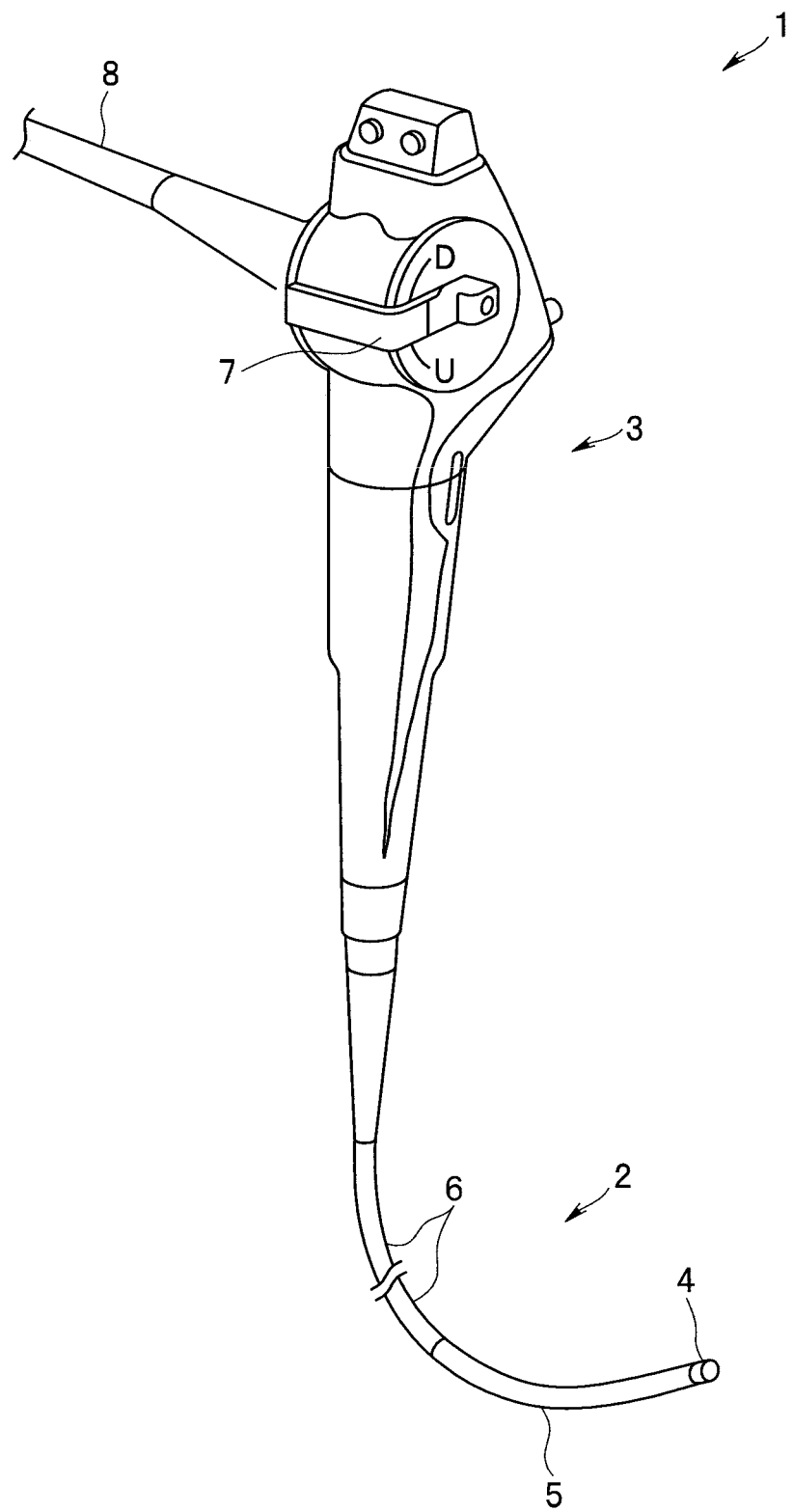
FIG. 1 is a perspective view of an endoscope.

An endoscope 1 in the present embodiment shown in FIG. 1 is, for example, a medical single-use endoscope used only a single time. The endoscope 1 includes an insertion section 2, an operation section 3, and a universal cable 8.

The insertion section 2 is an elongated long member to be inserted into an observation target site. In the insertion section 2, a distal end rigid portion 4, a bending portion 5, and a flexible tube portion 6 are consecutively connected in order from a distal end side.

The operation section 3 is connected to a proximal end side of the flexible tube portion 6. In the operation section 3, an operation lever 7 or the like for bending the bending portion 5 in, for example, up and down two directions is provided.

The universal cable 8 extends, for example, from a side portion of the operation section 3. An extending end portion (not shown) of the universal cable 8 is connectable to well-known various devices (a signal processing device, a light source device, an air feeding and water feeding device, and the like) via a connector (not shown).

Subsequently, about a configuration on the distal end side of the insertion section 2, a configuration of the bending portion 5 is mainly explained.

The distal end rigid portion 4 of the insertion section 2 is formed of a rigid member. In the distal end rigid portion 4, for example, an illumination optical system for illuminating an inside of a subject and an objective optical system of an image pickup unit that picks up an image of the inside of the subject are disposed. Further, for example, an air feeding and water feeding channel for supplying a fluid into the subject and a treatment instrument insertion channel from which a treatment instrument such as forceps is led out are opened on a distal end face of the distal end rigid portion 4.

The bending portion 5 includes a bending tube 10 (see FIG. 2) and an outer coat tube (not shown) having flexibility such as a rubber material covering an outer circumference of the bending tube 10.

The bending tube 10 includes a front end tubular member 11A coupled to the distal end rigid portion 4 and a rear end tubular member 11B coupled to the flexible tube portion 6. Note that in the following explanation, the front end tubular member 11A and the rear end tubular member 11B are collectively referred to as both-end tubular members 11 as appropriate.

Between the both-end tubular members 11, the bending tube 10 includes a plurality of first tubular members 12 and a plurality of second tubular members 13 as bending pieces. The first tubular members 12 and the second tubular members 13 are respectively formed in substantially annular shapes. The first tubular members 12 and the second tubular members 13 are alternately arrayed in a longitudinal axis O direction of the insertion section 2. Further, the first tubular members 12 and the second tubular members 13 adjacent to each other are turnably coupled. Each of the first tubular members 12 includes a first tubular opening extending in an axial direction of the first tubular member 12 from a first tubular end to a second tubular end and each of the second tubular members 13 includes a second tubular opening extending in an axial direction of the second tubular member 13 from a first tubular end to a second tubular end.

Figure 3:
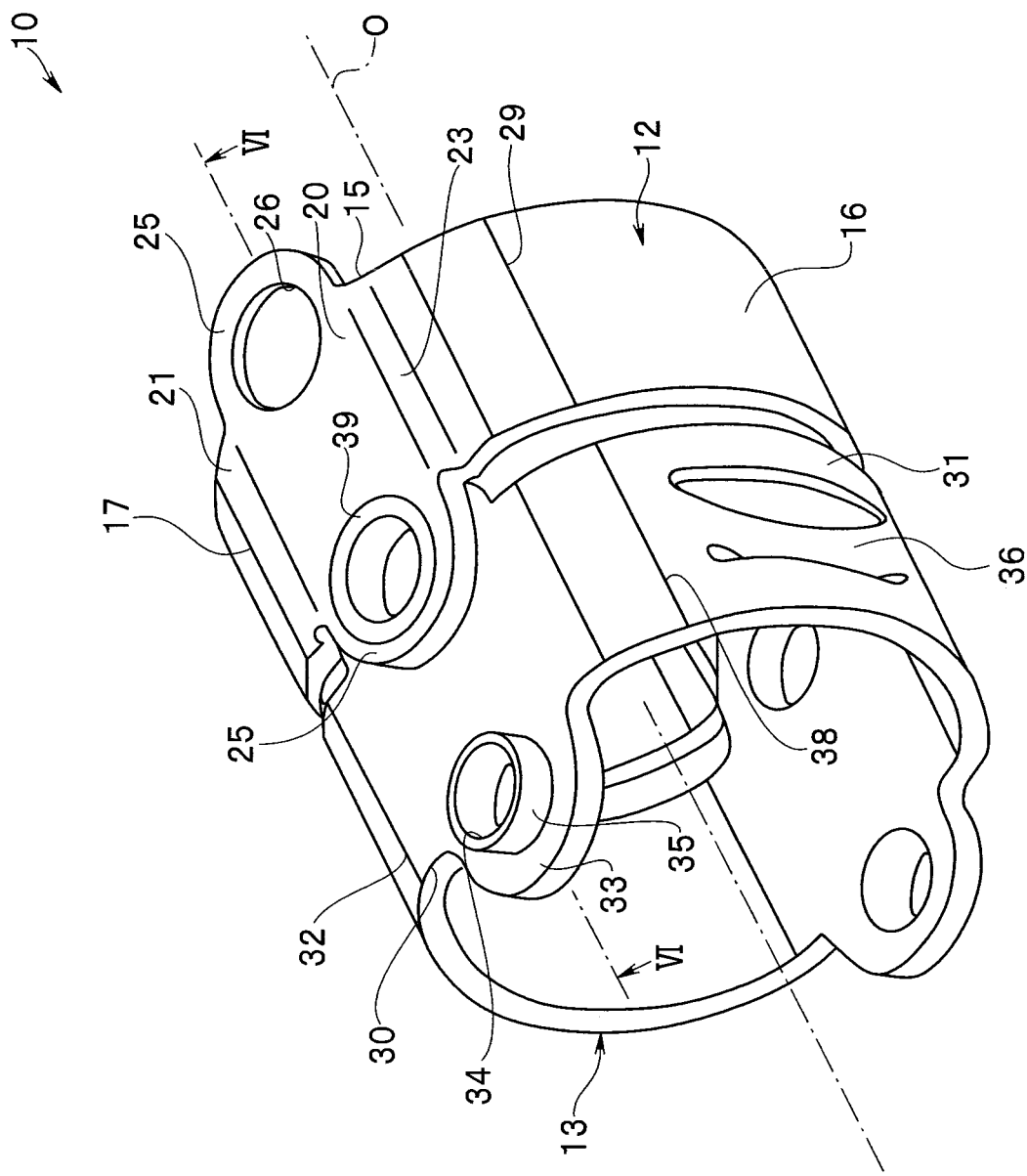
FIG. 3 is a perspective view showing a coupled state of a first tubular member and a second tubular member.

Each of the first tubular members 12 includes, as shown in FIG. 3, first hinge portions 15 and first peripheral wall portions 16.

The first hinge portions 15 are provided to be paired in symmetrical positions with respect to a center axis (that is, a longitudinal axis O) of the first tubular member 12.

The first hinge portions 15 include a first flat portion 20 and second flat portions 21.

A plan view shape of the first flat portion 20 is a substantially elliptical shape. First tongue piece portions 25 (first end portion, second end portion) are respectively formed at both end portions in the longitudinal axis O direction of the first flat portion 20. The first tongue piece portions 25 function as a first coupling portion for superimposing and coupling end portions of the second tubular members 13. First holes 26 are formed in the centers of the first tongue piece portions 25. The first holes 26 are holes piercing through the first tongue piece portions 25 in a radial direction of the longitudinal axis O (a direction orthogonal to the longitudinal axis O). An outer circumference surface of the distal end of the projecting portion 35 may have a second chamfered surface.

The second flat portions 21 are provided at both side ends of the first flat portion 20.

Further, step portions 23 are formed between the first flat portion 20 and the second flat portions 21. The first flat portion 20 is disposed on an outer circumference side of the first tubular member 12 by thickness of the first tubular member 12 with respect to the second flat portions 21 by the step portions 23.

The first peripheral wall portions 16 are provided to be paired between the paired first hinge portions 15 and in symmetrical positions with respect to the longitudinal axis O. Note that first ridge lines 17 are formed between the first hinge portions 15 and the first peripheral wall portions 16.

Figure 2:
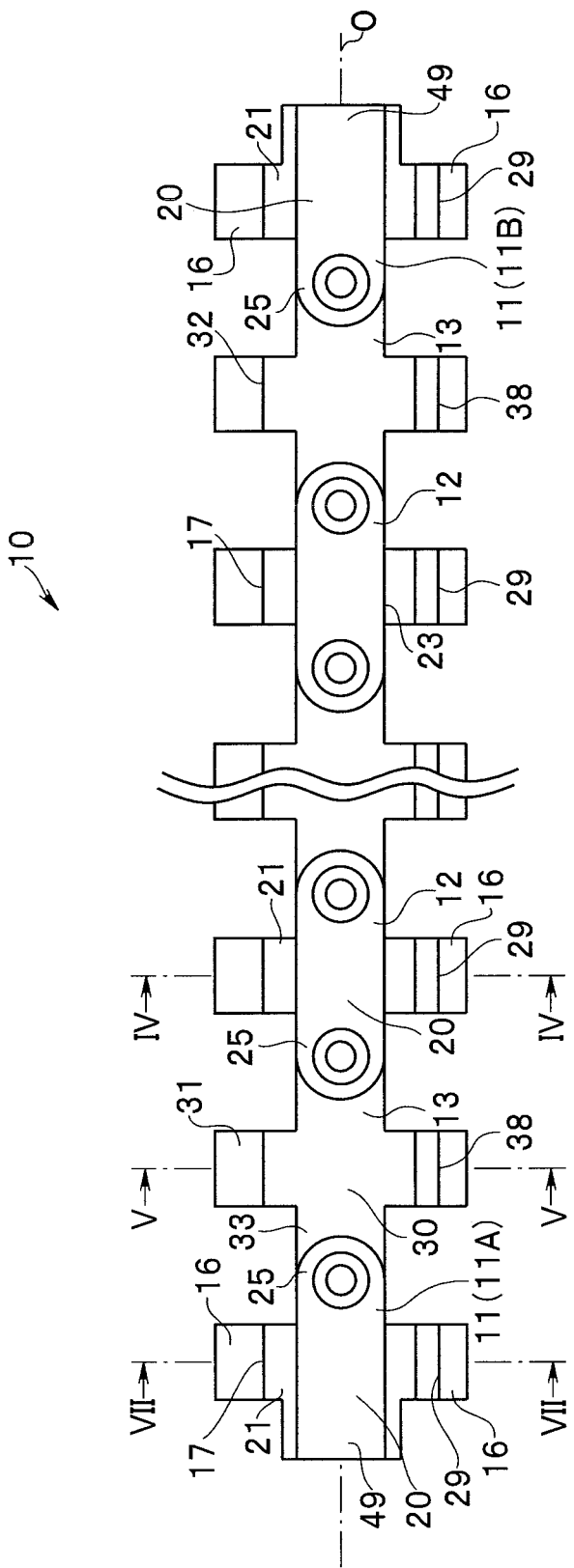
FIG. 2 is a plan view of a bending tube.
Figure 4:
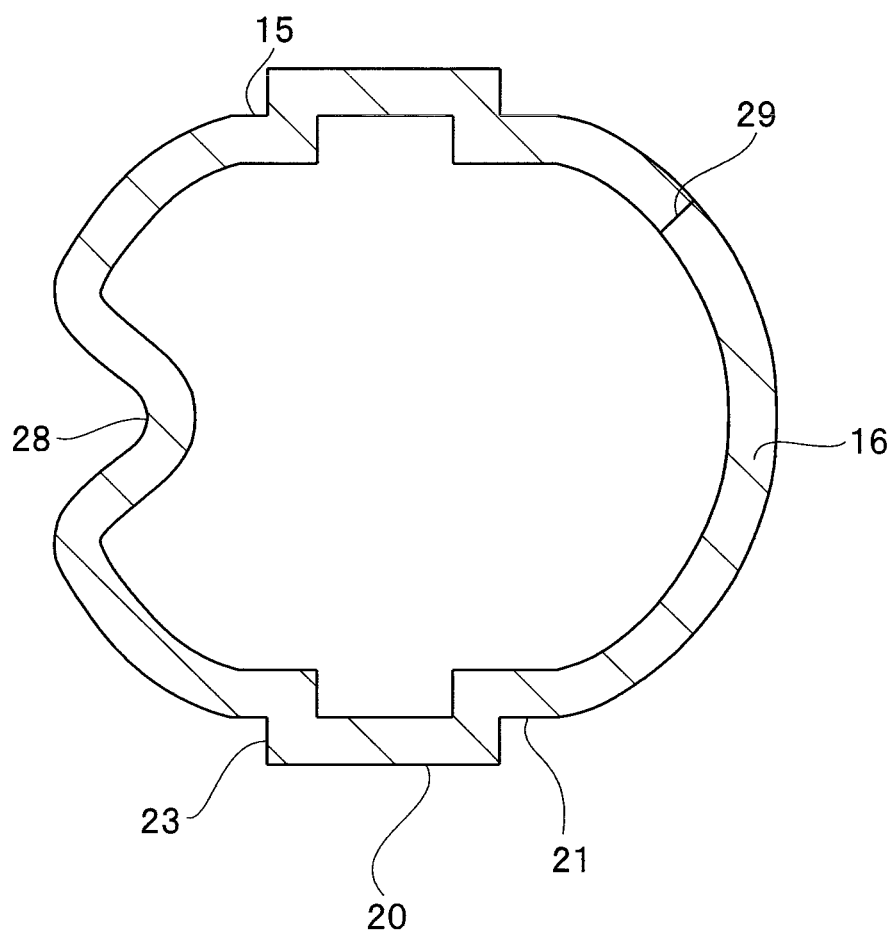
FIG. 4 is a IV-IV sectional view of FIG. 2.

FIG. 4 is a IV-IV sectional view of FIG. 2. As shown in FIG. 4, a first wire receiver 28 is provided in one of the pair of the first peripheral wall portions 16. The first wire receiver 28 is formed by forming two slits extending in a circumferential direction in the first peripheral wall portion 16 and projecting a belt-like portion between the two slits in a C shape inwardly in a radial direction. The first wire receiver 28 is disposed to be 90° separated from the first flat portion 20 in a circumferential direction of the first tubular member 12.

Note that as explained below, the first tubular member 12 in the present embodiment is formed by machining a first tubular member preparation body 12*a* formed in a flat shape into a tubular shape. Therefore, a first bonding portion 29 is formed in the longitudinal axis O direction in the first tubular member 12.

Each of the second tubular members 13 includes, as shown in FIG. 3, second hinge portions 30 and second peripheral wall portions 31. Thickness of the second tubular member 13 is substantially the same as the thickness of the first tubular member 12.

The second hinge portions 30 are provided to be paired in symmetrical positions with respect to a center axis (the longitudinal axis O) of the second tubular member 13.

The second hinge portions 30 are formed by flat portions formed in a substantially elliptical shape as a plan view shape. Second tongue piece portions 33 are respectively formed at both end portions in the longitudinal axis O direction of the second hinge portions 30. The second tongue piece portions 33 function as superimposed portions superimposed on end portions (the first tongue piece portions 25) of the first tubular member 12. Further, the second tongue piece portions 33 function as second coupling portions for coupling the first tongue piece portions 25. Projecting portions 35 functioning as turning shafts are formed in centers of the second tongue piece portions 33. The projecting portions 35 are projected in an outer diameter direction of the longitudinal axis O (a direction orthogonal to the longitudinal direction O) from the second tongue piece portions 33. Further, the projecting portions 35 include second holes 34. The second holes 34 are holes piercing through the second tongue piece portions 33 and the projecting portions 35 in the radial direction of the longitudinal axis O. Such projecting portions 35 are formed by, for example, burring.

The second peripheral wall portions 31 are formed to be paired between the paired second hinge portions 30 and in symmetrical positions with respect to the longitudinal axis O.

Second ridge lines 32 are formed between the second hinge portions 30 and the second peripheral wall portions 31 configured in this way.

Figure 5:
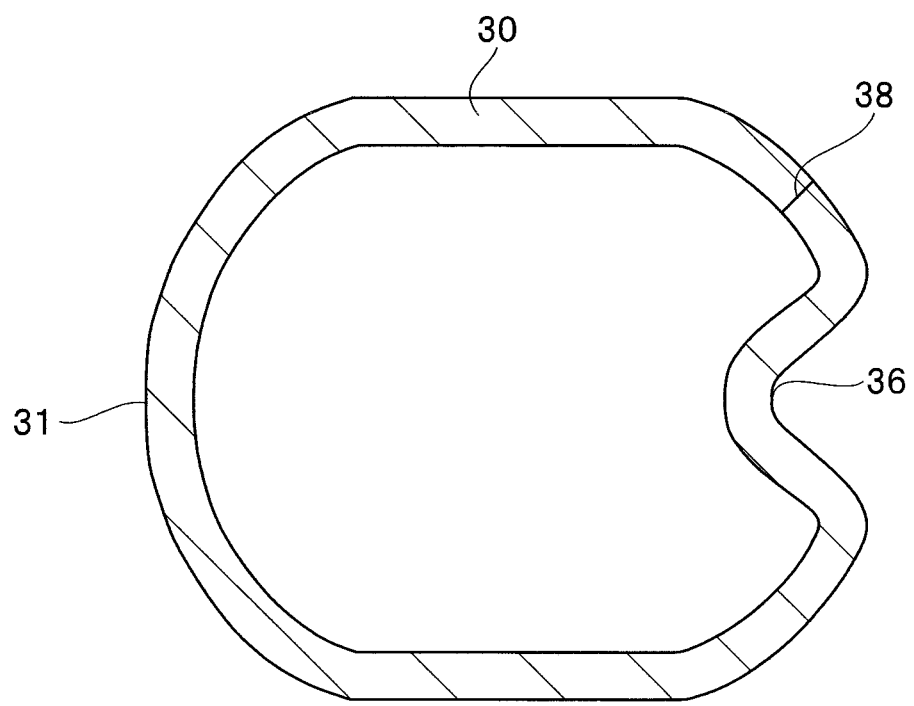
FIG. 5 is a V-V sectional view of FIG. 2.

FIG. 5 is a V-V sectional view of FIG. 2. As shown in FIG. 3 and FIG. 5, a second wire receiver 36 is provided in one of the pair of second peripheral wall portions 31. The second wire receiver 36 is formed by the same manufacturing method as the manufacturing method for the first wire receiver 28. The second wire receiver 36 is disposed to be separated 90° from the second hinge portions 30 in a circumferential direction of the second tubular member 13.

Note that as explained below, the second tubular member 13 is formed by machining second tubular member preparation bodies 13*a* formed in a flat shape into a tubular shape. Therefore, a second bonding portion 38 is formed in the longitudinal axis O direction in the second tubular member 13.

The projecting portions 35 of the second tubular member 13 configured in this way are inserted into the first holes 26 of the first tubular member 12 adjacent to the second tubular member 13. In other words, in a state in which the second tongue piece portions 33 are superimposed on the first tongue piece portions 25, the projecting portions 35 are inserted into the first holes 26. Distal end portions of the projecting portions 35 are expanded (swaged), whereby the first tubular member 12 and the second tubular member 13 are turnably coupled. Each of the projecting portions may have a base end connected to the end portion and a distal end of each of the projecting portions 35.

Figure 6:
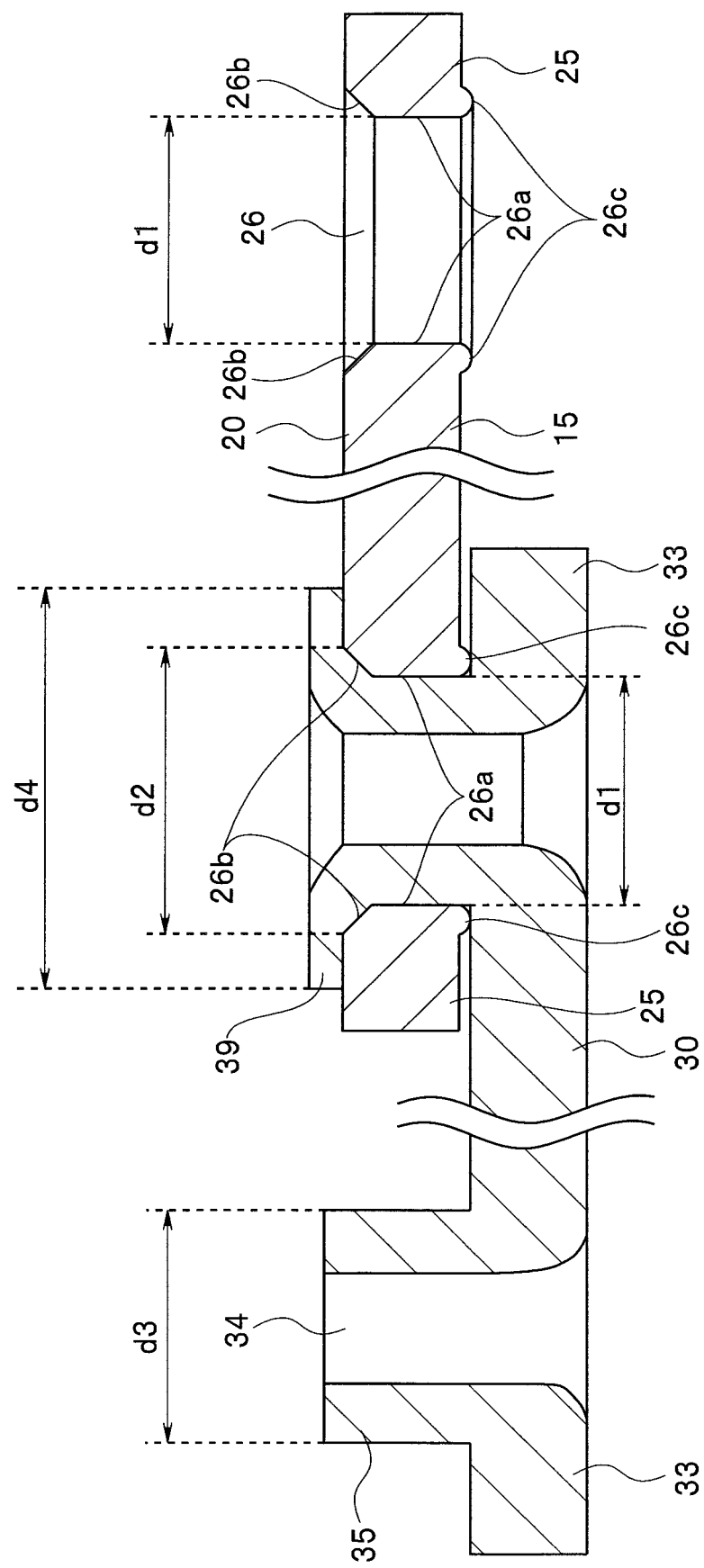
FIG. 6 is a VI-VI sectional view of FIG. 3.

FIG. 6 is a VI-VI sectional view of FIG. 3. As shown in FIG. 6, each of the first holes 26 includes a same diameter portion 26*a*, an inner diameter of which is uniform, and an expanded portion 26*b* (first chamfered surface), an inner diameter of which is expanded. Further, a projection 26*c* is formed around an opening of the first hole 26 on an inner surface of the first tongue piece portion 25.

In the first hole 26, the same diameter portion 26*a* is provided in a region closer to the inner surface in a thickness direction of the first tongue piece portion 25.

In the first hole 26, the expanded portion 26*b* is provided in a region closer to an outer surface in the thickness direction of the first tongue piece portion 25. An end portion on the proximal end side of the expanded portion 26*b* (the inner surface side in the thickness direction of the first tongue piece portion 25) is connected to the same diameter portion 26*a*. An end portion on the distal end side of the expanded portion 26*b* (the outer surface side in the thickness direction of the first tongue piece portion 25) is opened in the outer surface of the first tongue piece portion 25.

The expanded portion 26*b* is formed in a taper shape expanded in the inner diameter from the proximal end side toward the distal end side. In other words, an inner diameter of the expanded portion 26*b* is expanded in a direction of a distal end of the projecting portion 35 (the turning shaft) inserted into the first hole 26. More specifically, an inner diameter of a proximal end side end portion of the expanded portion 26*b* is a dimension equal to an inner dimeter d1 of the same diameter portion 26*a*. An inner diameter d2 of the distal end side end portion of the expanded portion 26*b* is a dimension larger than the inner diameter d1 of the same diameter portion 26*a*. Consequently, the expanded portion 26*b* is formed in, for example, a truncated cone shape.

The projection 26*c* is formed along the same diameter portion 26*a* by a protrusion projecting in a direction opposed to the expanded portion 26*b*. Therefore, a vertex of the projection 26*c* comes into contact with an outer surface of the second tongue piece portion 33 when the first tubular member 12 and the second tubular member 13 are coupled.

Note that the expanded portion 26b and the projection 26c of the first hole 26 are formed by, for example, punching the first hole 26 as explained below.

The inner diameter d1 of the first hole 26 coupled in this way is set to a dimension slightly larger than an outer diameter d3 of the projecting portion 35.

In a state in which the first tubular member 12 and the second tubular member 13 are coupled, a slip-stop 39 for maintaining engagement of the first hole 26 and the projecting portion 35 is formed at a distal end of the projecting portion 35. The slip-stop 39 is formed by expanding the distal end of the projecting portion 35 to an expanded diameter d4 larger than the inner diameter d1 of the first hole 26. A part on the distal end side of the projecting portion 35 is formed in a shape conforming to a surface of the expanded portion 26b by the slip-stop 39.

Note that when the first tubular member 12 and the second tubular member 13 are coupled, the first wire receiver 28 and the second wire receiver 36 are disposed to be separated 180° from each other in a circumferential direction of the bending tube 10.

The bending tube 10 configured in this way can be bent in two directions by respective operation wires (not shown) inserted into the first wire receiver 28 and the second wire receiver 36.

Note that although the bending tube 10 is configured to be bent in the two directions in the present embodiment, the bending tube 10 may be configured to be bent in four directions.

The first bonding portion 29 and the second bonding portion 38 are disposed such that, when the first tubular member 12 and the second tubular member 13 are coupled, an angle from the first hinge portion 15 to the first bonding portion 29 around the longitudinal axis O of the bending tube 10 is substantially the same as an angle from the second hinge portion 30 to the second bonding portion 38 around the longitudinal axis O of the bending tube 10 (see FIG. 3).

Figure 7:
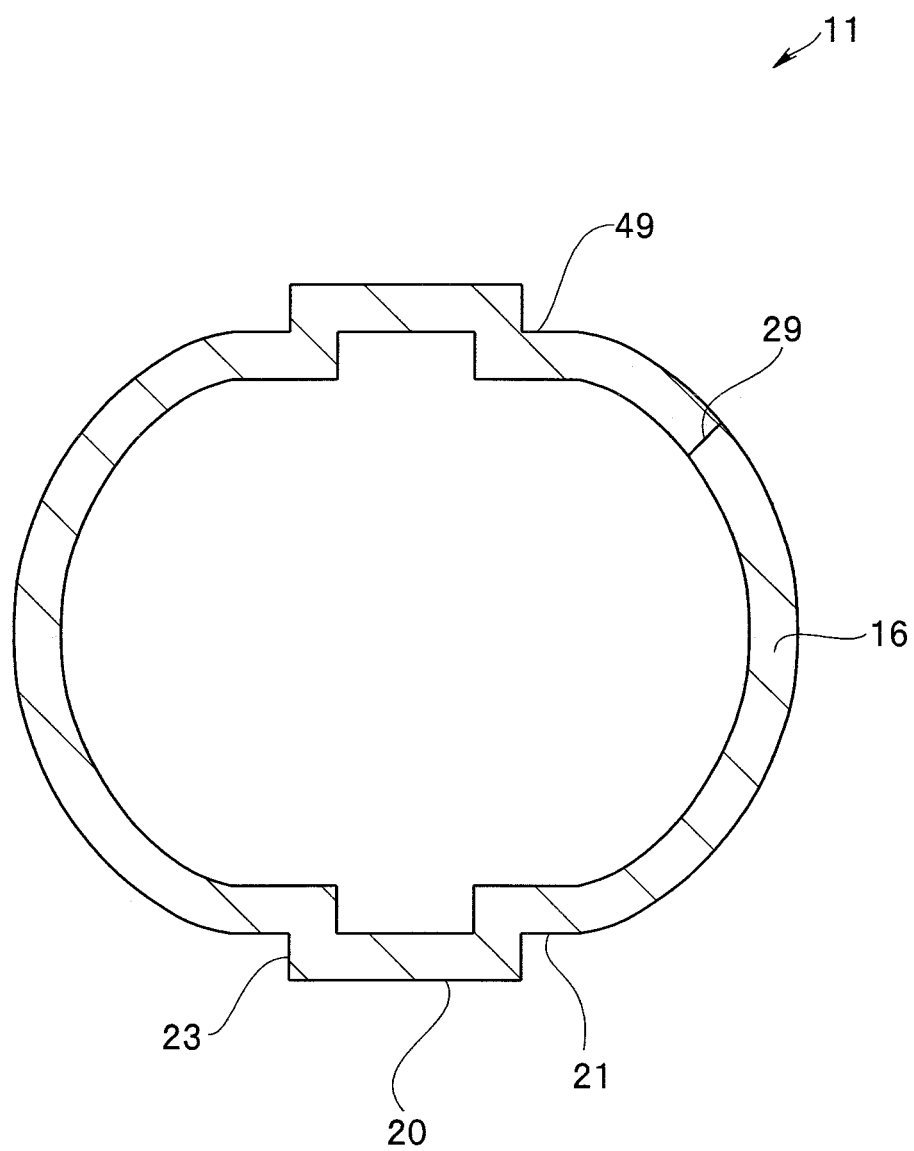
FIG. 7 is a VII-VII sectional view of FIG. 2.

FIG. 7 is a VII-VII sectional view of FIG. 2. As shown in FIG. 2 and FIG. 7, each of the both-end tubular members 11 basically has substantially the same configuration as the configuration of the first tubular member 12. However, in the front end tubular member 11A, the first tongue piece portion 25 is provided only on the proximal end side in the longitudinal axis O direction in the first hinge portion 15. A coupling portion 49 for coupling the bending tube 10 to the distal end rigid portion 4 is provided on the distal end side in the longitudinal axis O direction of the front end tubular member 11A. On the other hand, in the rear end tubular member 11B, the first tongue piece portion 25 is provided only on the distal end side in the longitudinal axis O direction in the first hinge portion 15. The coupling portion 49 for coupling the bending tube 10 to the flexible tube portion 6 is provided on the proximal end side in the longitudinal axis O direction of the rear end tubular member 11B. Besides, among the respective components in the both-end tubular members 11, components corresponding to the components of the first tubular member 12 are denoted by the same reference numerals and signs and explanation is omitted about the components.

Figure 8:
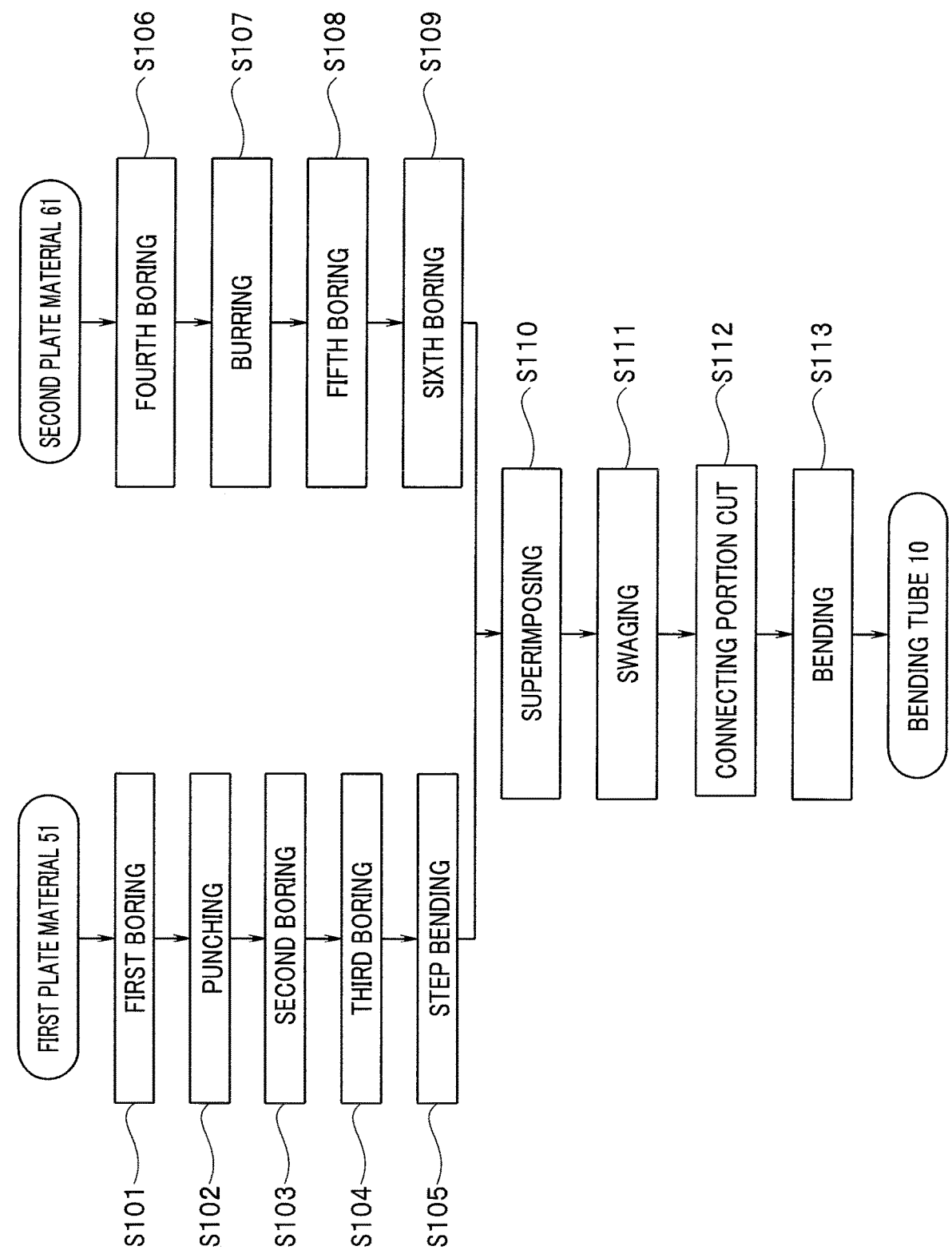
FIG. 8 is a flowchart showing a manufacturing process for the bending tube.

Subsequently, a manufacturing method for the bending tube 10 according to the present embodiment is explained. FIG. 8 is a flowchart showing the manufacturing process for the bending tube 10. Here, in the manufacturing process for the bending tube 10 explained below, the bending tube 10 is manufactured by machining a first plate material 51 and a second plate material 61.

As shown in FIG. 8, in the manufacturing process for the bending tube 10, machining for the first plate material 51 made of metal is performed in steps S101 to S105. Both-end tubular member preparation bodies 11a forming the both-end tubular members 11 and first tubular member preparation bodies 12a forming the first tubular members 12 are formed by the machining of the first plate material 51.

Steps S101 to S105 are explained below. Note that steps S101 to S105 are performed by pressing by a die.

In the machining of the first plate material 51, first boring for the first plate material 51 is performed in a process of step S101. FIG. 9A is a diagram showing a state after the first boring for the first plate material 51 was performed. As shown in FIG. 9A, in the first boring, the first holes 26 respectively corresponding to the both-end tubular members 11 and the plurality of first tubular members 12 are formed in the first plate material 51. Further, in the first boring, a plurality of (for example, eight) first positioning holes 59 are formed in the first plate material 51.

In the following process in step S102, punching for the first holes 26 is performed. FIG. 9B is a diagram showing a state after the punching. As shown in FIG. 9B, the punching is performed using a punching punch 37 and a pedestal 41. The pedestal 41 includes a recess 41a for forming the projection 26c. As shown in FIG. 9B, in the punching, for example, the first plate material 51 is placed in a state in which the first plate material 51 is positioned on the pedestal 41. At this time, the positioning on the pedestal 41 is performed using, for example, the first positioning hole 59. The first surface of the first plate material 51 is brought into contact with the pedestal 41. The punching using the punching punch 37 is performed for the first holes 26 of the first plate material 51 from the second surface side of the first plate material 51.

Here, in the present embodiment, the first surface of the first plate material 51 is a surface on a side on which inner circumferential surfaces of the both-end tubular members 11 and the first tubular members 12 are formed. The second surface of the first plate material 51 is a surface on a side on which outer circumferential surfaces of the both-end tubular members 11 and the first tubular members 12 are formed.

The expanded portion 26b is formed in the first hole 26 by such punching. Further, the projection 26c is formed around an opening of the first hole 26.

The expanded portion 26b is formed by crushing a corner portion of the first hole 26 at a skew angle of, for example, 45 degrees with the punching by the punching punch 37 having a distal end taper shape. Therefore, the inner diameter d2 of the distal end side end portion of the expanded portion 26b is a dimension larger than the inner diameter d1 of the same diameter portion 26a of the first hole 26 (see FIG. 6).

Figure 9C:
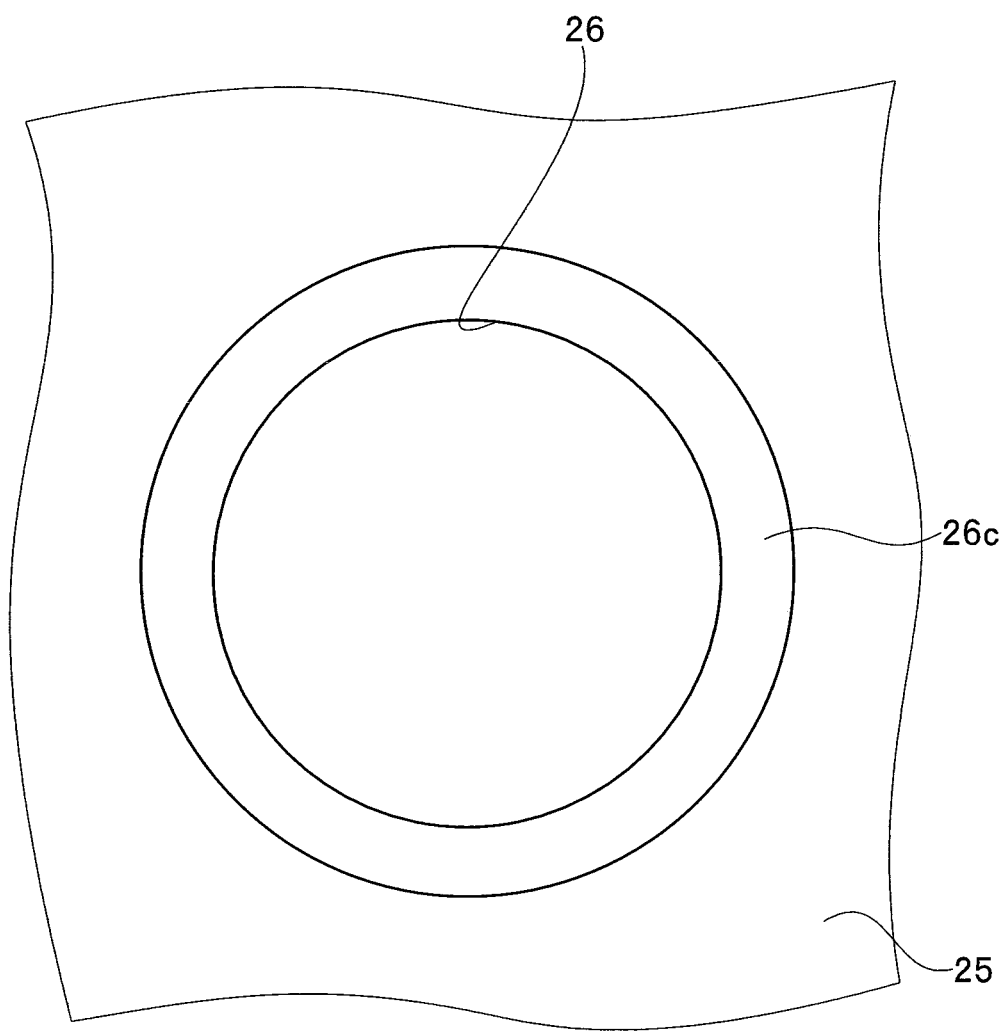
FIG. 9C is a plan view showing a shape of a projection formed around an opening of a first hole.

The projection 26c is formed by a part of the first plate material 51 projecting to the second surface side because of undulation of the first plate material 51 by the punching. More specifically, when the punching is performed, a part of the first plate material 51 projecting because of the undulation is deformed to conform to a shape of the recess 41a of the pedestal 41. Consequently, the projection 26c is formed to project from the first plate material 51. A shape of the projection 26c is formed in, for example, an annular shape as shown in FIG. 9C.

Note that the punching by the punching punch 37 is not limited to punching on a burr surface and may be punching on a sagging surface.

In the following process in step S103, second boring for the first plate material 51 is performed. FIG. 10A is a diagram showing a state after the second boring for the first plate material 51 was performed. As shown in FIG. 10A, a first wire reception preparation portion 28*a* forming the first wire receiver 28 of the first tubular member 12 is formed in the first plate material 51 by the second boring.

FIG. 10B is an enlarged diagram showing a range X in FIG. 10A. As shown in FIG. 10B, the first wire reception preparation portion 28*a* is formed by forming a plurality of pairs of slits 27 in the first plate material 51 with the second boring. Note that the first wire reception preparation portion 28*a* is machined in a C shape inward in a radial direction of the first tubular member 12, for example, in bending in step S113 explained below. Consequently, the first wire receiver 28 is formed.

Figure 11:
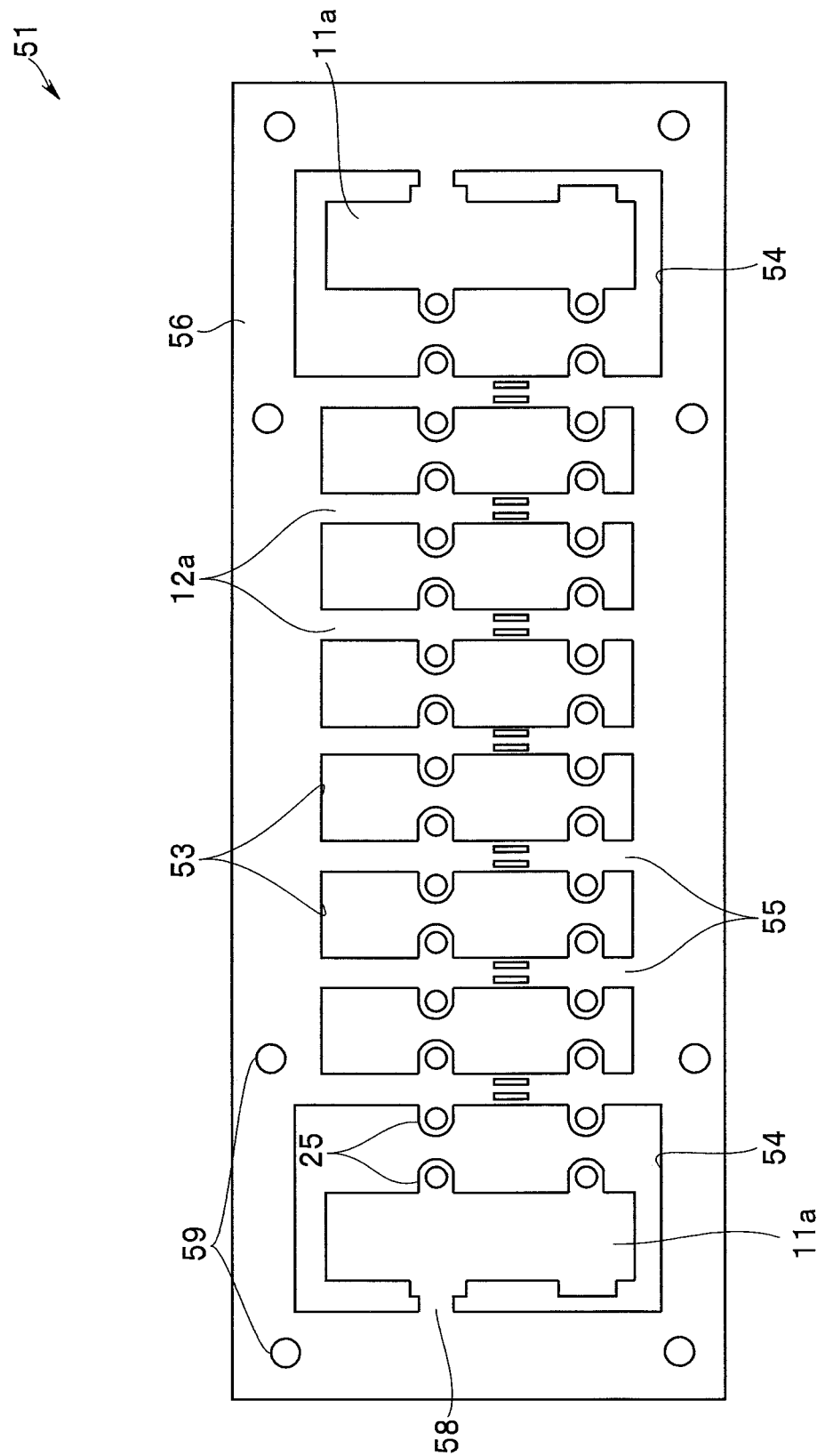
FIG. 11 is a plan view showing a state after a third boring process for the first plate material was performed.

In the following process in step S104, third boring for the first plate material 51 is performed. FIG. 11 is a diagram showing a state after the third boring for the first plate material 51 was performed. As shown in FIG. 11, the both-end tubular member preparation bodies 11*a* forming the both-end tubular members 11 and the first tubular member preparation bodies 12*a* forming the first tubular members 12 are formed by the third boring.

In other words, a plurality of punched holes 53 are formed at every predetermined interval in the first plate material 51 by the third boring. Consequently, a plurality of first tubular member preparation bodies 12*a* arrayed in a row are formed in the first plate material 51. Here, an interval of the plurality of punched holes 53 is set to an interval appropriate for disposing the second tubular member preparation bodies 13*a*. Further, a pair of punched holes 54 is formed in the first plate material 51 by the third boring. The punched holes 54 are respectively formed at both ends of the array of the plurality of first tubular member preparation bodies 12*a*. Consequently, the both-end tubular member preparation bodies 11*a* are formed in the first plate material 51.

The first tongue piece portions 25 of the both-end tubular member preparation bodies 11*a* and the first tubular member preparation bodies 12*a* are formed in the first plate material 51 by the respective punched holes 53 and 54. In the respective first tubular member preparation bodies 12*a*, both ends of the belt-like portion forming the first peripheral wall portion 16 are coupled to a first edge 56 of the first plate material 51 via first connecting portions 55. End portions on the opposite side of a side on which the first tongue piece portions 25 of the both-end tubular member preparation bodies 11*a* are provided are coupled to the first edge 56 via both-end connecting portions 58.

Note that the eight first positioning holes 59 formed in step S101 explained above are provided at the first edge 56. The first tubular member preparation bodies 12*a* may have a configuration in which only one end portions are coupled to the first edge 56 via the first connecting portions 55 and the other end portions are not coupled to the first edge 56.

Figure 12:
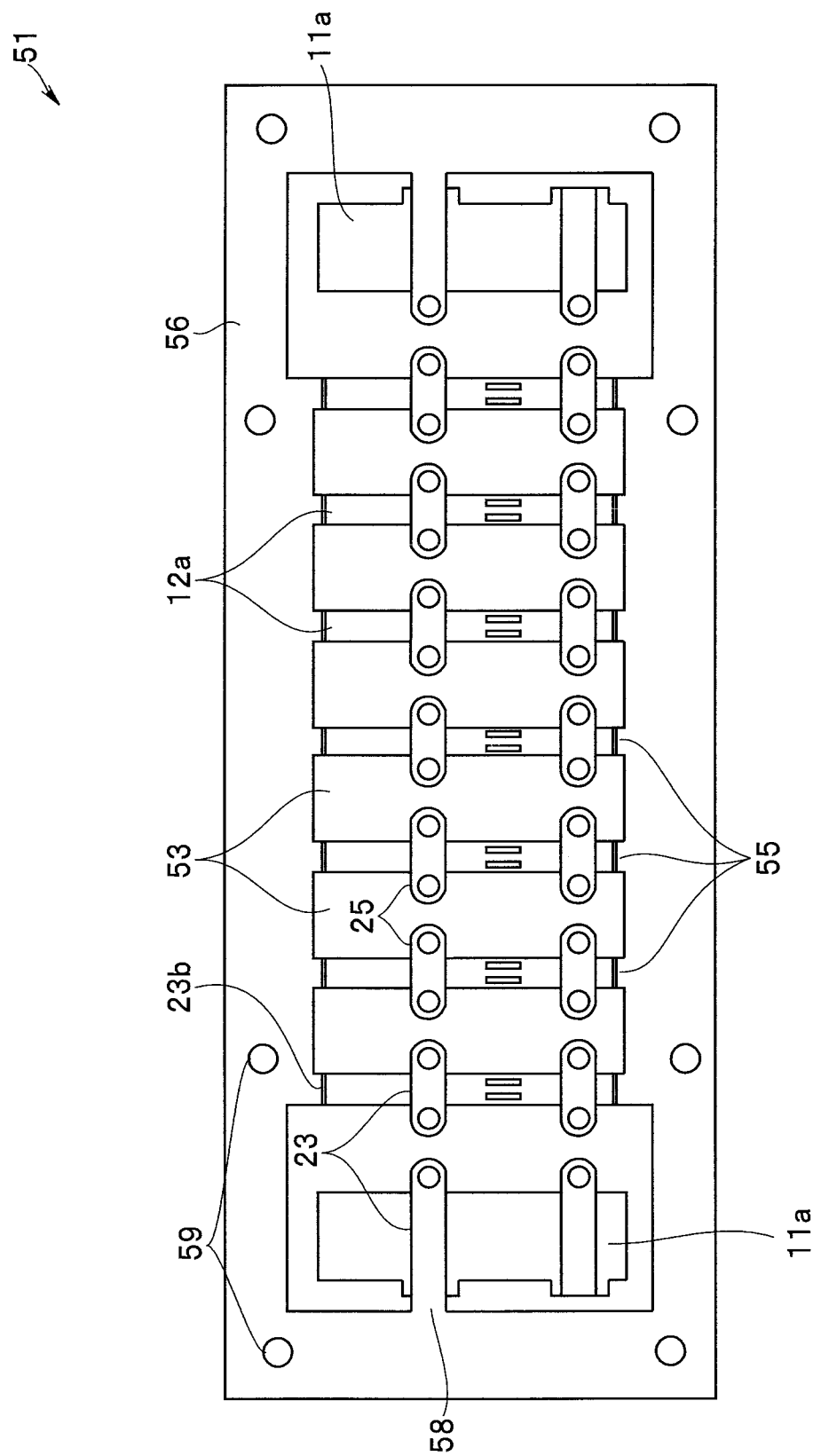
FIG. 12 is a plan view showing a state after a step bending process for the first plate material was performed.

In the following process in step S105, step bending for the first plate material 51 is performed. FIG. 12 is a diagram showing a state after the step bending for the first plate material 51 was performed. As shown in FIG. 12, step portions 23 in a thickness direction of the first plate material 51 are formed in the both-end tubular member preparation bodies 11*a* and the first tubular member preparation bodies 12*a* by the step bending.

Figure 13A:
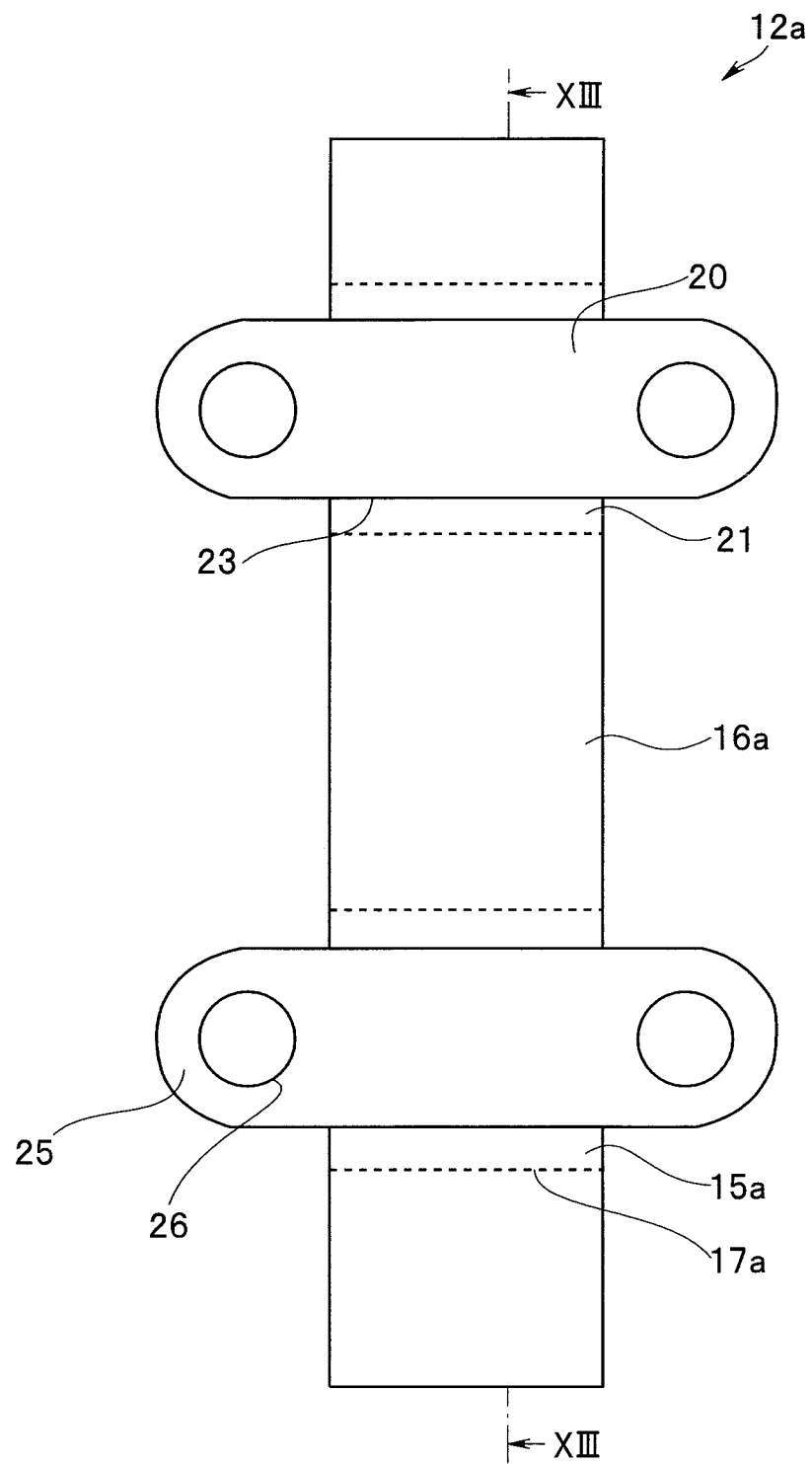
FIG. 13A is a plan view showing a state after a step bending process for a first tubular member preparation body was performed.
Figure 13B:
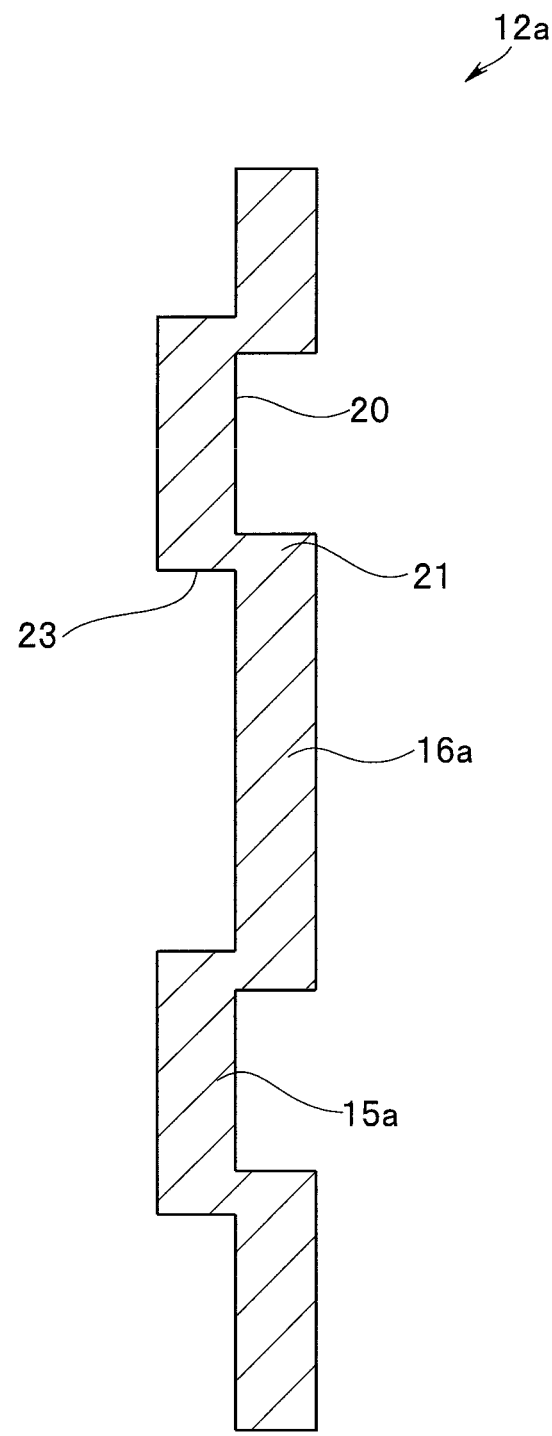
FIG. 13B is a XIII-XIII sectional view of FIG. 13A.

FIG. 13A is a diagram showing the first tubular member preparation body 12*a* in a state after the step bending was performed. FIG. 13B is a XIII-XIII sectional view of FIG. 13A. As shown in FIG. 13A and FIG. 13B, a first hinge portion preparation portion 15*a* and a first peripheral wall portion preparation portion 16*a* are formed in the first tubular member preparation body 12*a* after the step bending was performed.

A first ridge line forming portion 17*a* forming the first ridge line 17 after the bending (step S113) for converting the first tubular member preparation body 12*a* into an annular shape explained below was performed is provided between the first hinge portion preparation portion 15*a* and the first peripheral wall portion preparation portion 16*a*. The first flat portion 20 and the second flat portion 21 are formed in the first hinge portion preparation portion 15*a* by the step portion 23. A step between the first flat portion 20 and the second flat portion 21 in the step portion 23 is equal to thickness of the first tubular member preparation body 12*a*.

Further, step portions 23*b* are formed between the first edge 56 of the first plate material 51 and the respective first tubular member preparation bodies 12*a* by the step bending in step S105. By providing the step portions 23*b*, the first edge 56 of the first plate material 51 and the first flat portion 20 are disposed on the same plane.

In the step bending in step S105, similarly, the first flat portion 20 and the second flat portion 21 are formed by the step portion 23 in a both-end tubular member hinge portion preparation portion (not shown) of the both-end tubular member preparation body 11*a*.

Subsequently, in steps S106 to S109, machining for the second plate material 61 made of metal is performed. The second tubular member preparation bodies 13*a* forming the second tubular member 13 are formed by the machining for the second plate material 61.

Steps S106 to S109 are explained below. Note that respective processes in steps S106 to S109 are performed by pressing by a die.

Figure 14A:
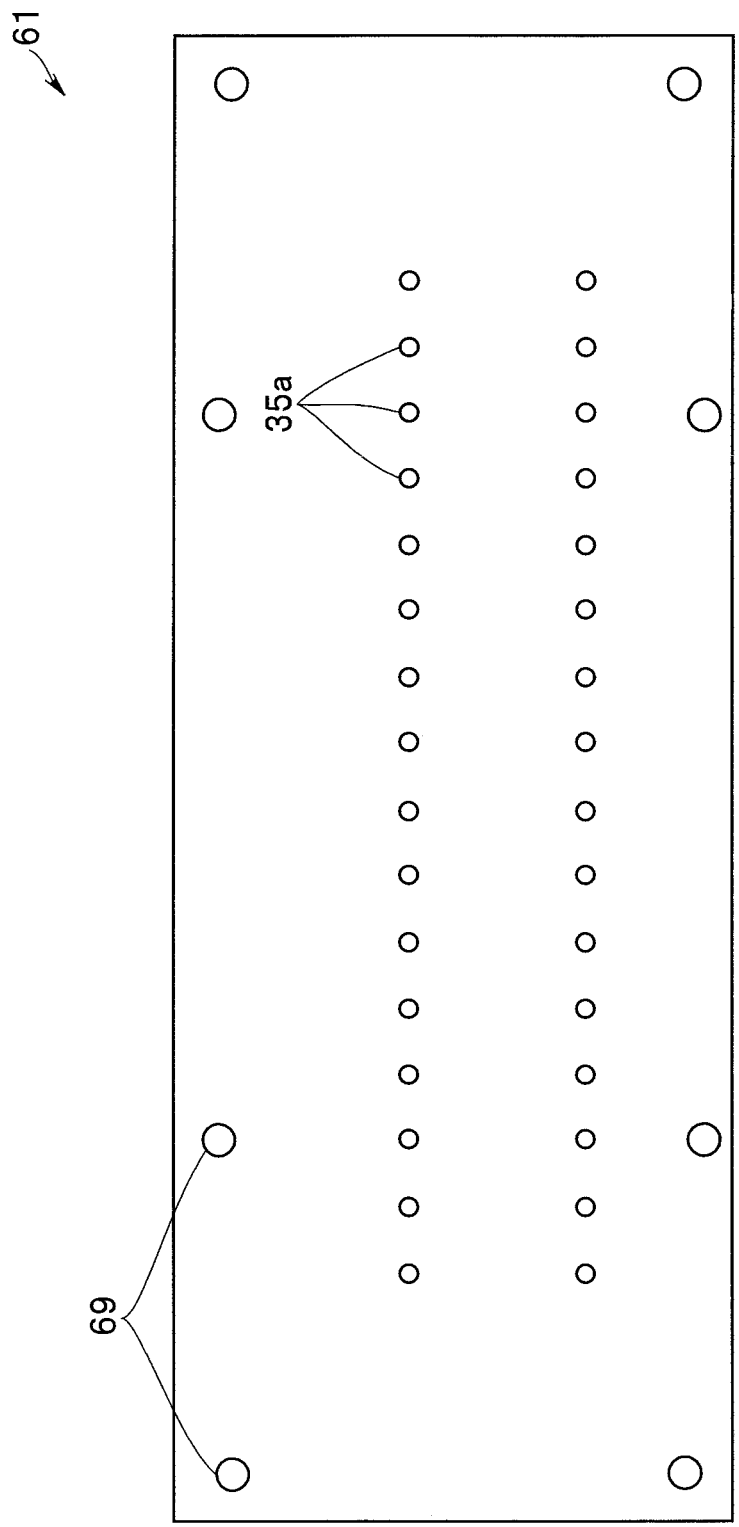
FIG. 14A is a plan view showing a state after a fourth boring process for a second plate material was performed.

In the machining for the second plate material 61, fourth boring for the second plate material 61 is performed in the process in step S106. FIG. 14A is a diagram showing a state after the fourth boring for the second plate material 61 was performed. As shown in FIG. 14A, in the fourth boring, for example, a plurality of lower holes 35*a* for burring are formed in the second plate material 61. The lower holes 35*a* are respectively formed in positions corresponding to the second holes 34 corresponding to the plurality of second tubular members 13.

Further, in the fourth boring, a plurality of (for example, eight) second positioning holes 69 are formed in the second plate material 61. The respective second positioning holes 69 are formed in positions respectively corresponding to the respective first positioning holes 59 formed in the first plate material 51.

Figure 14B:
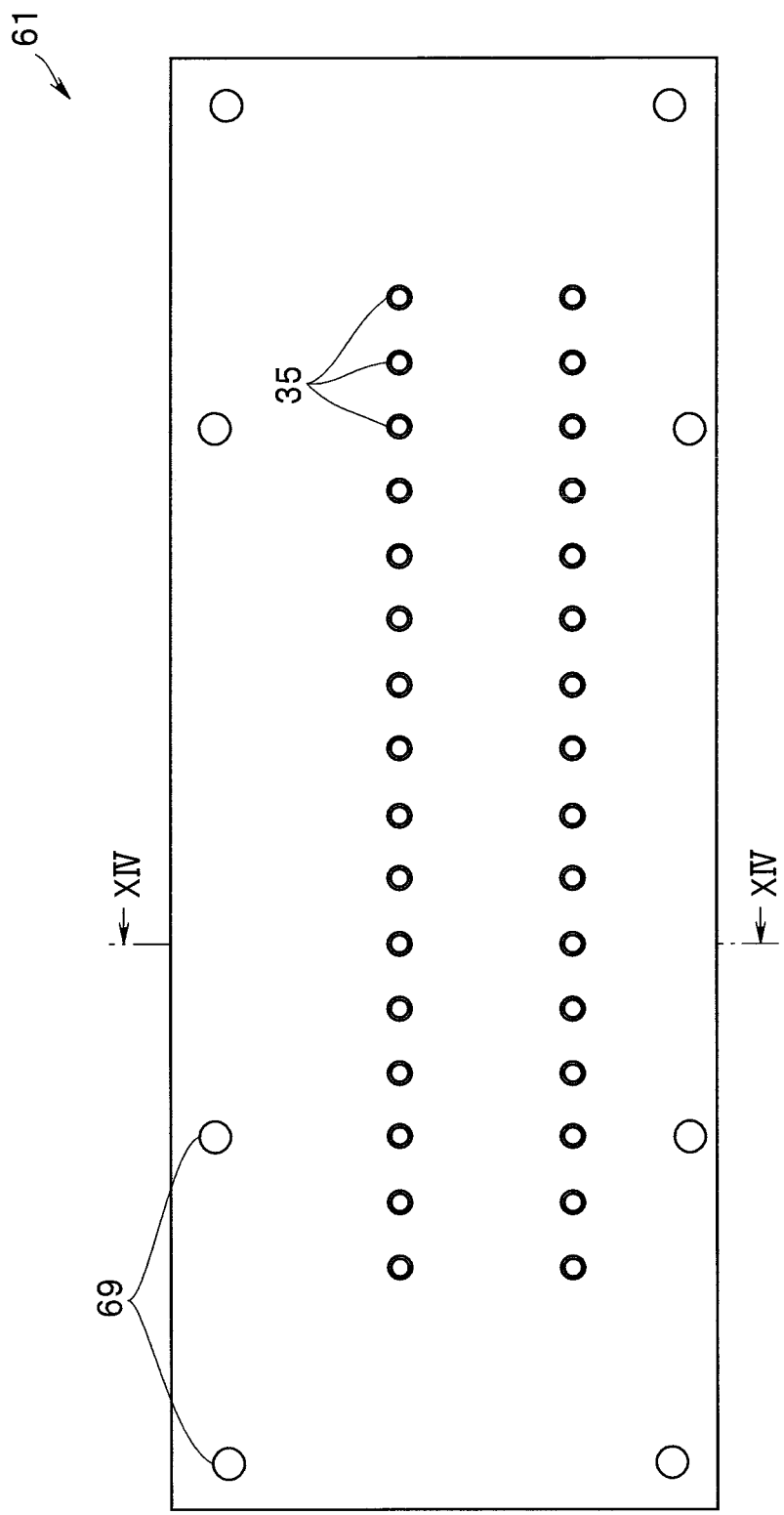
FIG. 14B is a plan view showing a state after a burring process for the second plate material was performed.
Figure 14C:
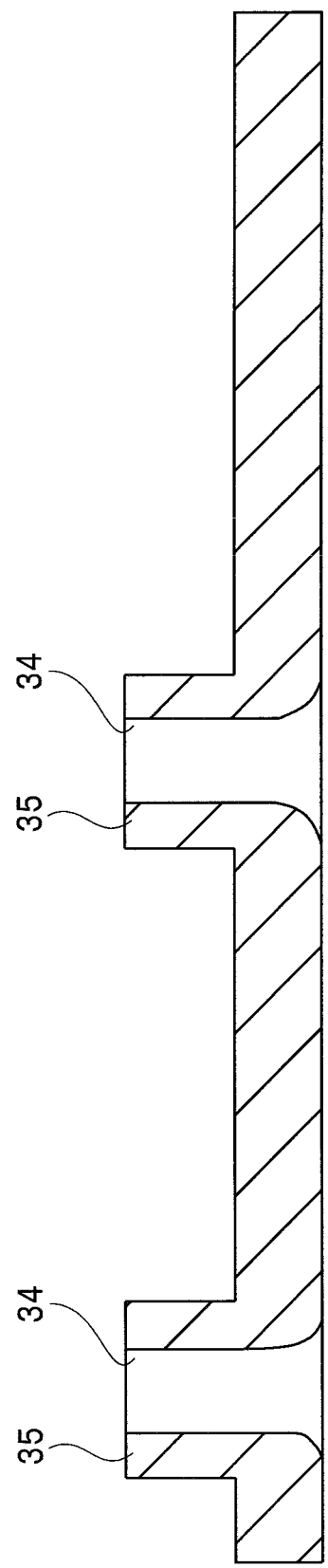
FIG. 14C is a XIV-XIV sectional view of FIG. 14B.

In the following process in step S107, burring for the second plate material 61 is performed. FIG. 14B and FIG. 14C are diagrams showing a state after the burring was performed. As shown in FIG. 14B and FIG. 14C, the lower holes 35*a* are machined by the burring. The projecting portions 35, which are turning shafts of the second tubular members 13, are formed in the second plate material 61. Further, the second holes 34 piercing through the projecting portions 35 in a projecting direction of the projecting portions 35 (the axial direction of the turning shafts) are formed in the projecting portions 35 by the burring.

Figure 15:
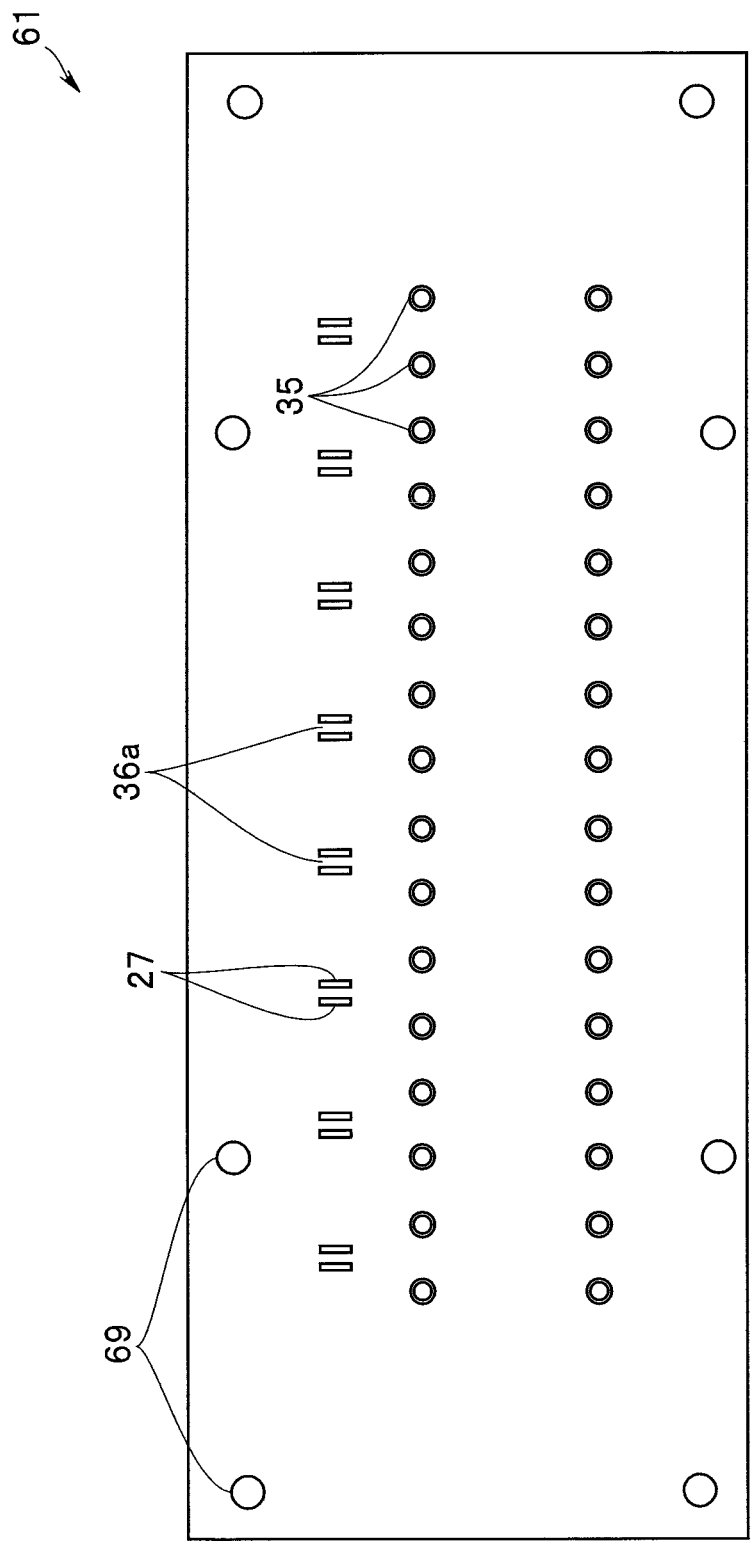
FIG. 15 is a plan view showing a state after a fifth boring process for the second plate material was performed.

In the following process in step S108, fifth boring for the second plate material 61 is performed. FIG. 15 is a diagram showing a state after the fifth boring for the second plate material 61 was performed. As shown in FIG. 15, second wire receiver preparation portions 36a forming the second wire receiver 36 of the second tubular member 13 are formed in the second plate material 61 by the fifth boring. In other words, the second wire receiver preparation portions 36a are formed by forming the plurality of pairs of slits 27 in the second plate material 61 with the fifth boring. The second wire receiver 36 is formed by the same manufacturing method as the manufacturing method for the first wire receiver 28, for example, in the bending in step S113 explained below.

Figure 16:
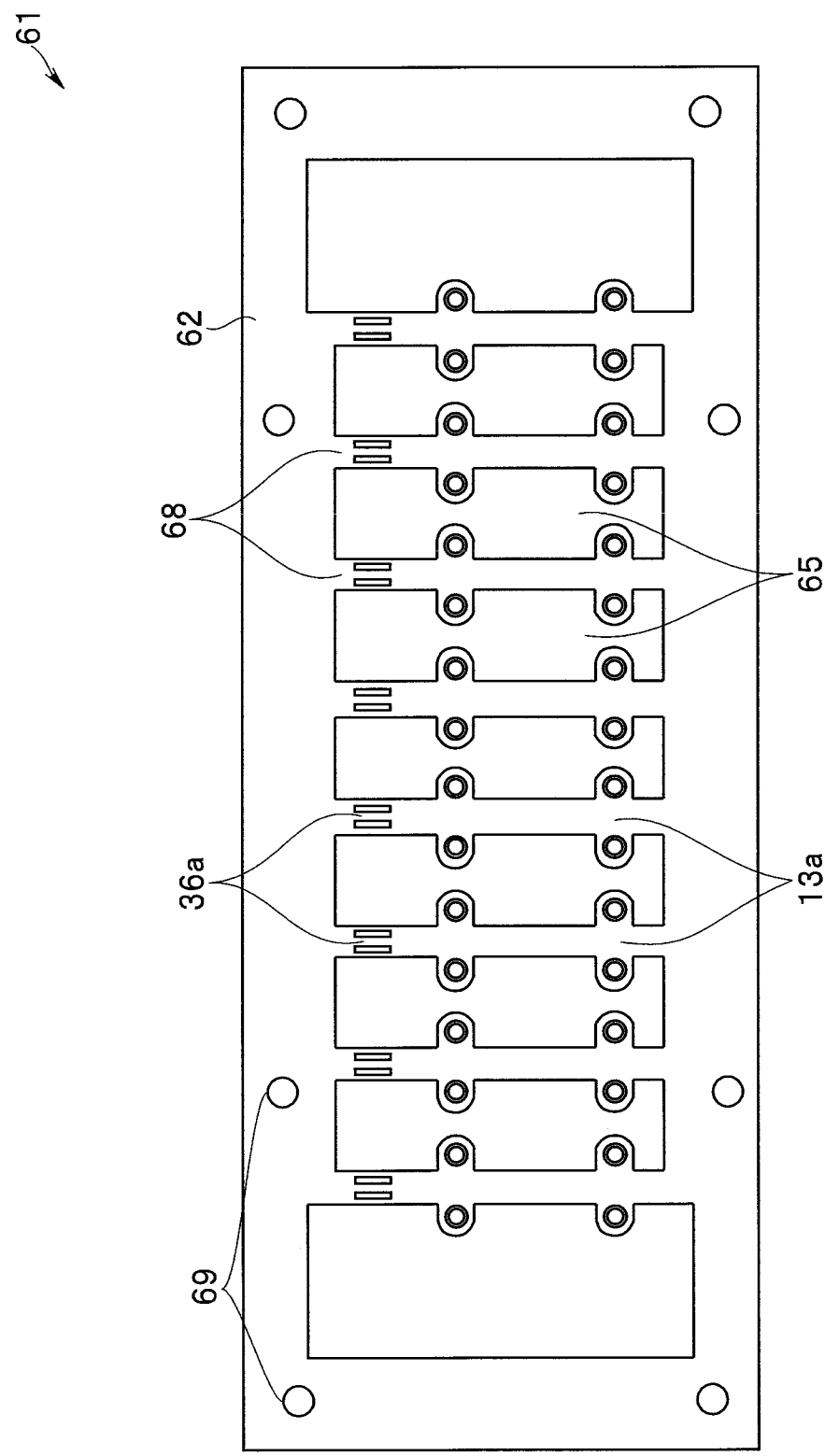
FIG. 16 is a plan view showing a state after a sixth boring process for the second plate material was performed.

In the following process in step S109, sixth boring for the second plate material 61 is performed. FIG. 16 is a diagram showing a state after the sixth boring for the second plate material 61 was performed. As shown in FIG. 16, the second tubular member preparation bodies 13a are formed in the second plate material 61 by the sixth boring.

In other words, a plurality of punched holes 65 are formed at every predetermined interval in the second plate material 61 by the sixth boring. Consequently, the plurality of second tubular member preparation bodies 13a arrayed in a row are formed in the second plate material 61. The interval of the plurality of punched holes 65 is set to an interval appropriate for disposing the first tubular member preparation bodies 12a.

The second tongue piece portions 33 of the second tubular member preparation bodies 13a are formed in the second plate material 61 by the respective punched holes 65. In the respective second tubular member preparation bodies 13a, both ends of the belt-like portion forming the second peripheral wall portion 31 are coupled to a second edge 62 of the second plate material 61 via second connecting portions 68.

Note that the second tubular member preparation bodies 13a may have a configuration in which only one end portions are coupled to the second edge 62 by the second connecting portions 68 and the other end portions are not coupled to the second edge 62.

Figure 17:
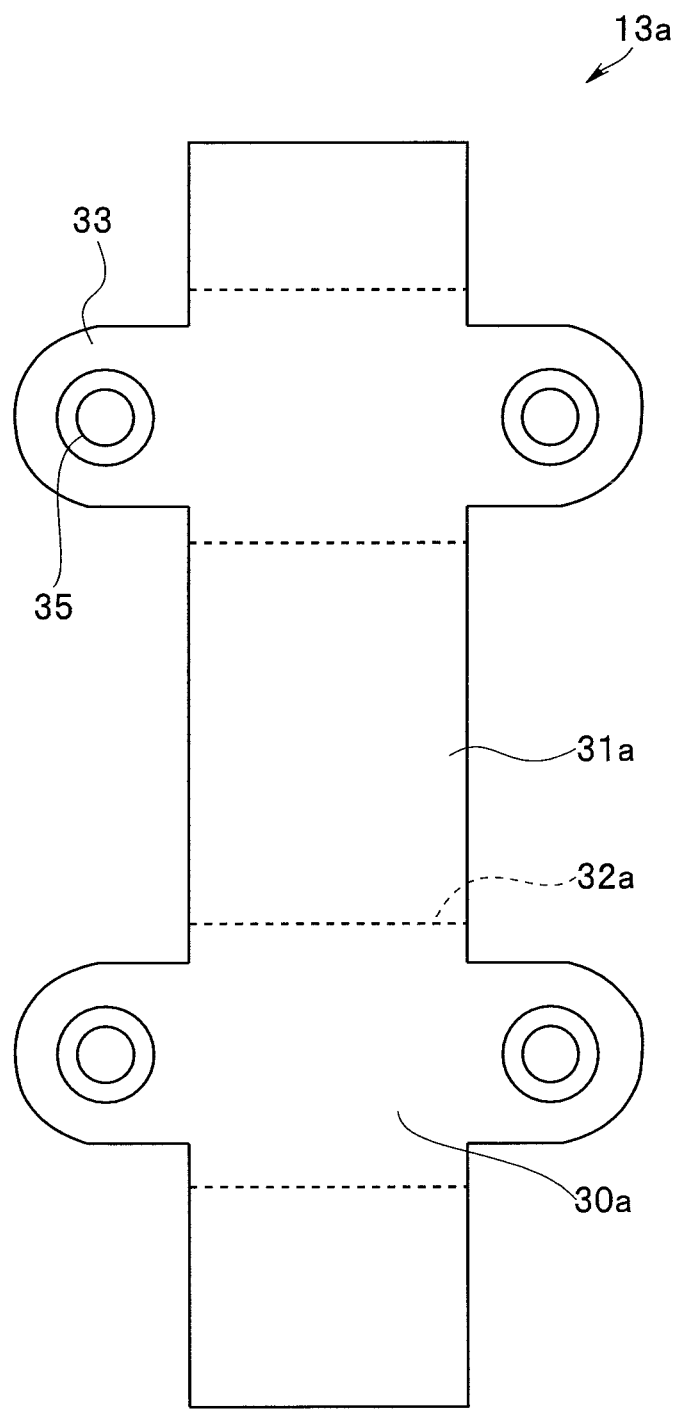
FIG. 17 is a plan view showing a second tubular member preparation body in a state after the sixth boring process was performed.

FIG. 17 is a diagram showing the second tubular member preparation body 13a in a state after the sixth boring was performed. As shown in FIG. 17, a second hinge portion preparation portion 30a and a second peripheral wall portion preparation portion 31a are formed in the second tubular member preparation body 13a. A second ridge line forming portion 32a forming the second ridge line 32 after the bending (step S113) for converting the first tubular member preparation bodies 12a into an annular shape explained below was performed is provided between the second hinge portion preparation portion 30a and the second peripheral wall portion preparation portion 31a.

Subsequently, in a process in step S110, the first plate material 51 for which the machining in step S101 to step S105 explained above was performed and the second plate material 61 for which the machining in step S106 to step S109 explained above was performed are superimposed.

In the superimposing process in step S110, the second plate material 61 is disposed in a state in which the projecting portions 35 of the second tongue piece portions 33 are projected upward. The first plate material 51 is superimposed on an upper side of the second plate material 61 in a state in which the first flat portion 20 is disposed further on the upper side than the second flat portion 21.

At this time, the first plate material 51 and the second plate material 61 are superimposed using a positioning mechanism or the like in a die. More specifically, the first plate material 51 and the second plate material 61 are superimposed in a state in which the first plate material 51 and the second plate material 61 are positioned to cause the respective first positioning holes 59 and the respective second positioning holes 69 to respectively coincide.

The first plate material 51 and the second plate material 61 are superimposed in positions where the respective first positioning holes 59 and the respective second positioning holes 69 coincide in this way, whereby the both-end tubular member preparation bodies 11a, the first tubular member preparation bodies 12a, and the second tubular member preparation bodies 13a are disposed in appropriate positions.

At that time, the respective projecting portions 35 are respectively inserted through the respective first holes 26. Consequently, the respective first holes 26 and the respective projecting portions 35 respectively engage. According to the engagement, the first tubular member preparation bodies 12a and the second tubular member preparation bodies 13a are coupled. Similarly, the both-end tubular member preparation bodies 11a and the second tubular member preparation bodies 13a are coupled.

Figure 18A:
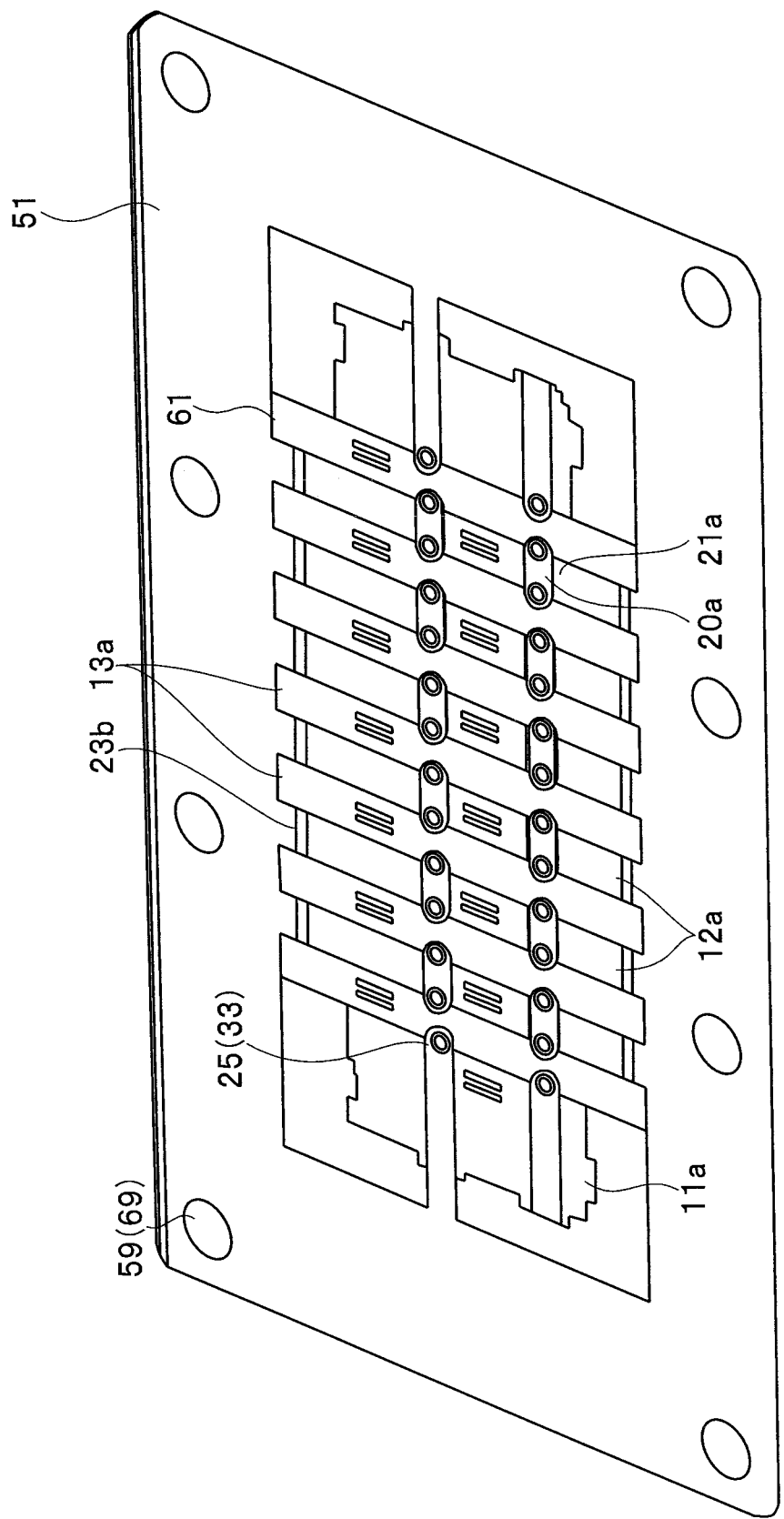
FIG. 18A is a perspective view showing a state after the first plate material and the second plate material were superimposed and expansion was performed by swaging.
Figure 18B:
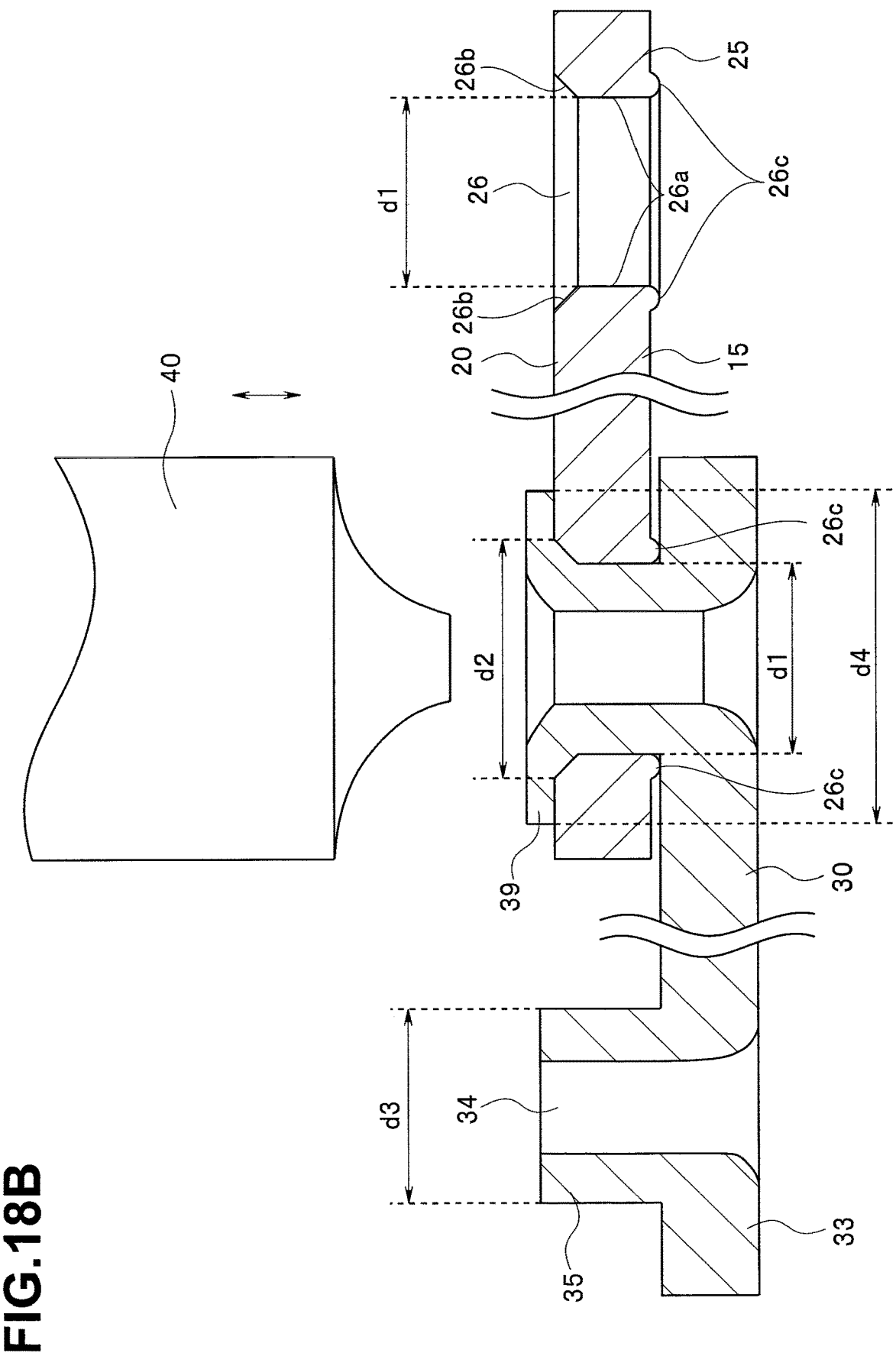
FIG. 18B is a sectional view showing a state after expansion was performed by an expansion punch.

In the following process in step S111, swaging for the second hole 34 provided in the projecting portion 35 is performed. FIG. 18A and FIG. 18B are diagrams showing a state after expansion was performed by swaging for the second hole 34 at the distal end portion of the projecting portion 35. As shown in FIG. 18B, the swaging for the second hole 34 is performed using an expansion punch 40. The slip-stop 39 is formed at the distal end portion of the projecting portion 35 by the expansion by the swaging. More specifically, in a state in which the first tubular member preparation bodies 12a and the second tubular member preparation bodies 13a are coupled, the distal end portion of the projecting portion 35 is expanded by driving a distal end portion of the expansion punch 40 into the second hole 34.

The slip-stop 39 is formed at the expanded distal end portion of the projecting portion 35. An expanded dimeter d4 of the slip-stop 39 formed in this way is expanded to be larger than the inner diameter d1 of the first hole 26.

Note that a distal end of the projecting portion 35 expanded in this way (more specifically, a part on the distal end side of the projecting portion 35) is formed to conform to a surface of the expanded portion 26b.

Figure 19:
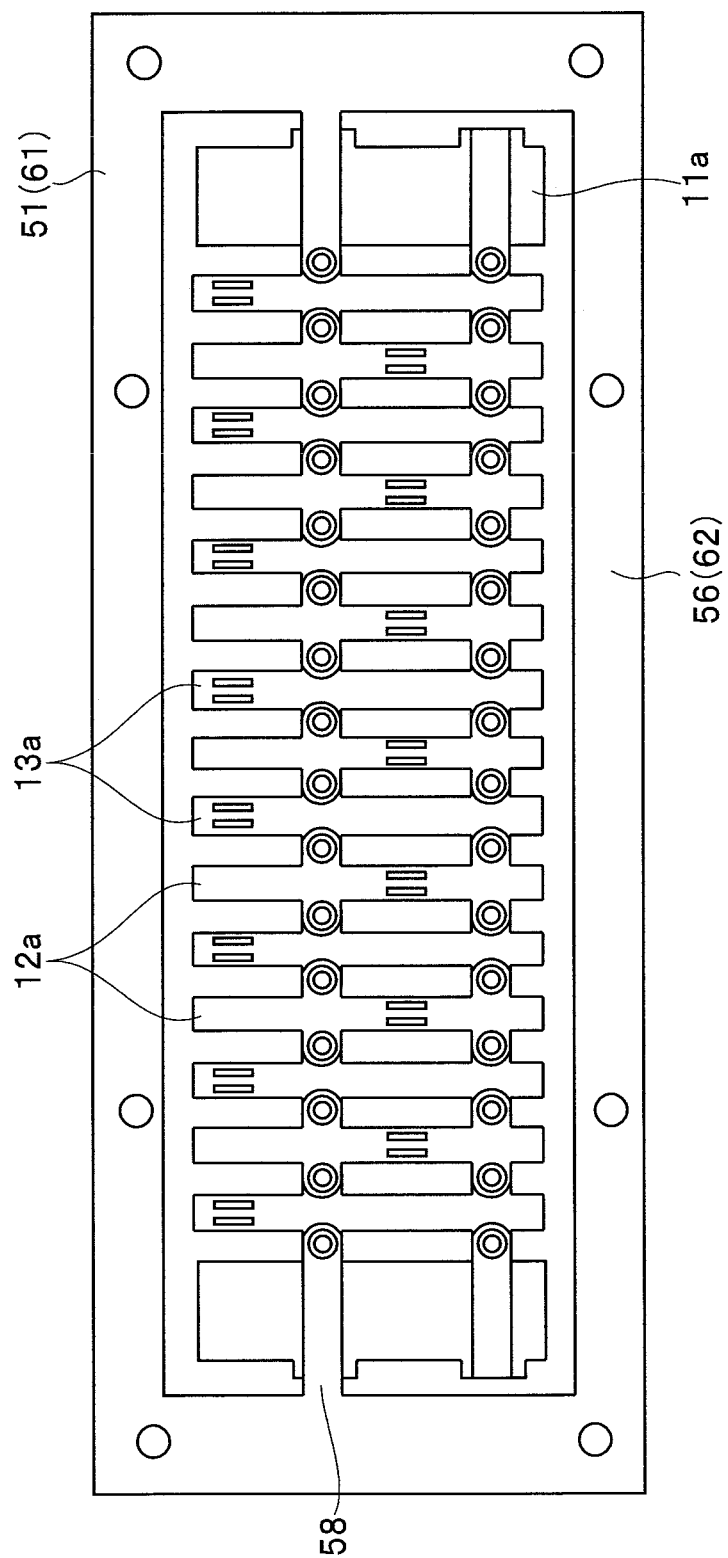
FIG. 19 is a plan view showing a state after a connecting portion cut process was performed.

In the following process in step S112, the first and second connecting portions 55 and 68 are cut. FIG. 19 is a diagram showing a state after the connecting portion cut process was performed. As shown in FIG. 19, in the connecting portion cut process, the first connecting portions 55 of the first plate material 51 are cut, whereby the first tubular member preparation bodies 12a are cut off from the first edge 56 of the first plate material 51. The second connecting portions 68 of the second plate material 61 are cut, whereby the second tubular member preparation bodies 13a are cut off from the second edge 62 of the second plate material 61.

The both-end tubular member preparation bodies 11a stay in a state in which the both-end tubular member preparation bodies 11a are coupled to the first edge 56 of the first plate material 51 by the both-end connecting portions 58. Note that the connecting portion cut process is performed by pressing by a die.

In the process in step S113, bending for the first plate material 51 and the second plate material 61 is performed. More specifically, as the bending for the first plate material 51, bending for the both-end tubular member preparation bodies 11a and the first tubular member preparation bodies 12a is performed. As the bending for the second plate material 61, bending for the second tubular member preparation bodies 13a is performed. The bending is performed by, for example, pressing by a die.

For example, in bending for the both-end tubular member preparation bodies 11a and the first peripheral wall portion preparation portions 16a of the first tubular member preparation bodies 12a, U-shape bending and O-shape bending are sequentially performed to form a second surface side of the first plate material 51 as outer circumferential surfaces of the first tubular members 12.

In other words, the bending is performed such that the projection 26c formed around the opening of the first hole 26 faces a radial direction inner side of the first tubular members 12. For the second peripheral wall portion preparation portions 31a of the second tubular member preparation bodies 13a, the same bending is performed in the same bending direction as the bending direction of the first peripheral wall portion preparation portions 16a.

Figure 20:
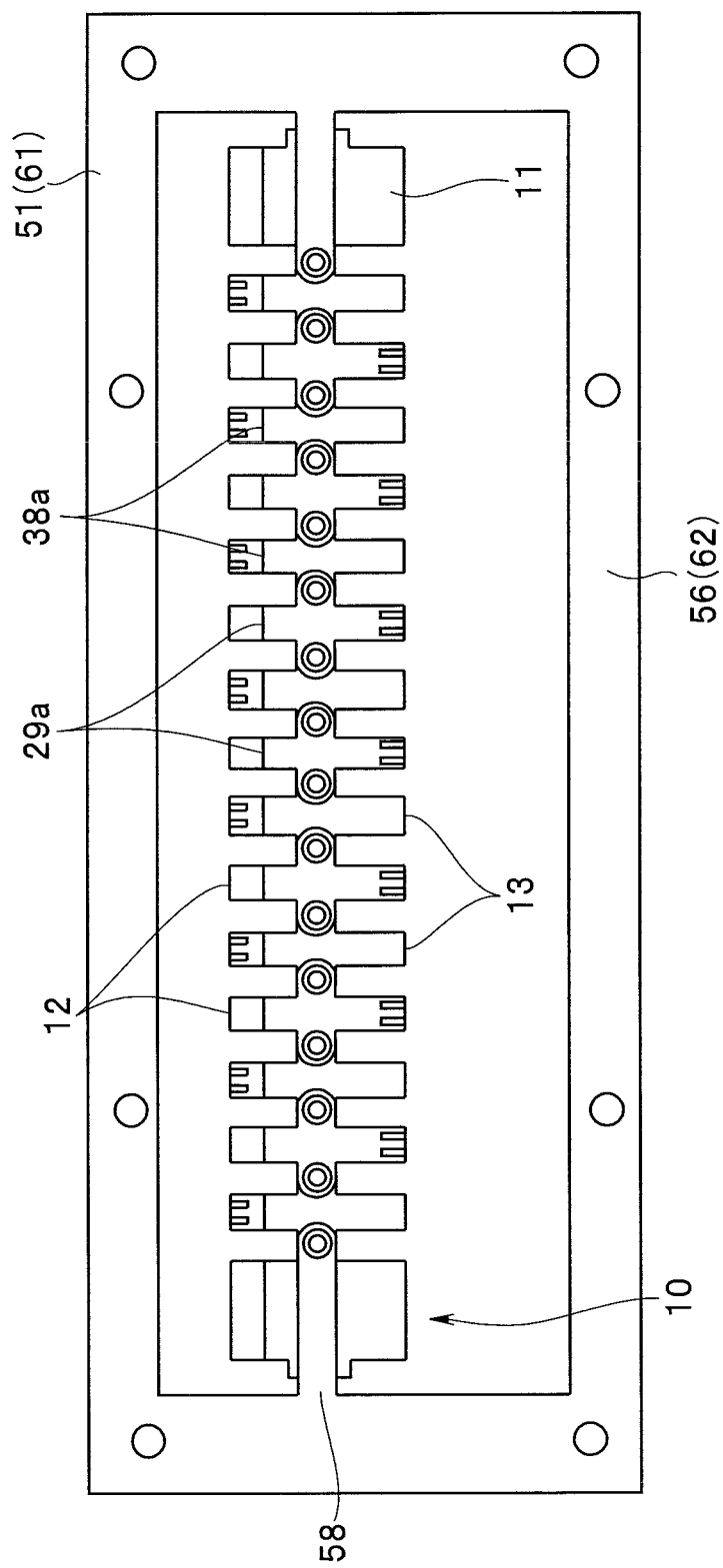
FIG. 20 is a plan view showing a state after bending was performed.

FIG. 20 is a diagram showing a state after the bending was performed. As shown in FIG. 20, by performing the bending, the first tubular members 12 by the first tubular member preparation bodies 12a are formed, the second tubular members 13 by the second tubular member preparation bodies 13a are formed, and the both-end tubular members 11 by the both-end tubular member preparation bodies 11a are formed.

Note that in the above explanation, an example is explained in which the bending is performed such that the projection 26c faces the radial direction inner side of the first tubular members 12. However, the bending may be performed in a direction in which the projection 26c faces a radial direction outer side of the first tubular members 12.

After the bending in S113, first bumping portions 29a against which both end faces of the first tubular member preparation bodies 12a are bumping are formed in the first tubular member preparation bodies 12a. Similarly, first bumping portions 29a against which both end faces of the both-end tubular member preparation bodies 11a are bumping are formed in the both-end tubular member preparation bodies 11a as well. A part or all of the first bumping portions 29a are bonded by laser welding or the like, whereby the first bonding portion 29 is formed in an axial direction of the first tubular members 12.

Similarly, second bumping portions 38a against which both end faces of the second tubular member preparation bodies 13a are bumping are formed in the second tubular member preparation bodies 13a. All or a part of the second bumping portions 38a are bonded, whereby the second bonding portion 38 is formed in an axial direction of the second tubular members 13.

The first tubular members 12 and the second tubular members 13 are completed by the bonding.

Note that after such bending is performed, the both-end connecting portions 58 are cut and the both-end tubular member preparation bodies 11a are cut off from the first edge 56, whereby the bending tube 10 is completed.

According to the embodiment explained above, the bending tube 10 of the endoscope 1 includes the first tubular members 12 including the first tongue piece portions 25 and the second tubular members 13 including the second tongue piece portions 33 superimposed on the first tongue piece portions 25, the projecting portions 35 turnably coupled to the first tongue piece portions 25 being formed in the second tubular members 13. The first tongue piece portions 25 of the first tubular members 12 include the first holes 26 piercing through the first tongue piece portions 25 in the radial direction of the longitudinal axis O, the projecting portions 35 being inserted into the first holes 26. In the first tongue piece portions 25, the projections 26c are formed around the first holes 26. The projecting portions 35 include the second holes 34 piercing through the projecting portions 35 in the axial direction (the projecting direction) of the projecting portions 35. Further, the second tongue piece portions 33 are provided in the second tubular members 13 such that the projections 26c come into contact with surfaces of the second tongue piece portions 33. With these components, the bending tube 10 of the endoscope 1 can reduce sliding resistance between the tubular members without relying on a technique of a manufacturing operator.

In other words, the bending tube 10 that couples and configures the first tubular members 12 and the second tubular members 13 includes the projections 26c that slide in contact with surface of the superimposed portions of the second tongue piece portions 33 when the bending tube 10 bends. With action of the projections 26c, the superimposed portions (the first tongue piece portions 25 and the second tongue piece portions 33) that couple the tubular members each other can reduce a contact area at the time when the projections 26c slide in contact with the superimposed portions. Therefore, it is possible to reduce sliding resistance between the tubular members compared with a bending tube not including the projections 26c.

Here, when coupling work for the first tubular members 12 and the second tubular members 13 is performed, the second tongue piece portions 33 are superimposed on the first tongue piece portions 25 and the projecting portions 35 are inserted into the first holes 26. At that time, the projections 26c provided in the first tongue piece portions 25 are brought into contact with the surfaces of the second tongue piece portions 33. The second holes 34 provided in the projecting portions 35 are expanded by pressing or the like. Even if a large press load is applied during the pressing or the like, since the first tongue piece portions 25 and the second tongue piece portions 33 are set in contact via the projections 26c, sliding resistance is prevented from excessively increasing. Therefore, it is possible to reduce the sliding resistance between the tubular members without relying on a technique and the like of a manufacturing operator.

The reduction in the sliding resistance between the first tongue piece portions 25 and the second tongue piece portions 33 by the projections 26c can smoothen operation of the bending tube 10 itself. Therefore, it is also possible to realize improvement of responsiveness in operation of the insertion section 2 of the endoscope 1.

The projections 26c provided in the first tongue piece portions 25 are formed by pressing by punching or the like by the punching punch 37 and the recess 41a provided in the pedestal 41. When the punching is performed by such pressing, the projections 26c are formed by causing a part of the first plate material 51 projected by undulation to deform to conform to a shape of the recess 41a of the pedestal 41. Therefore, the projections 26c can form protrusions having various shapes around the first holes 26 by changing the shape of the recess 41a.

FIG. 21 to FIG. 25 are diagrams showing modifications of the shape of the projection 26c. The respective figures show shapes of the projection after pressing was performed by changing the shape of the recess 41a in the present embodiment.

Figure 21:
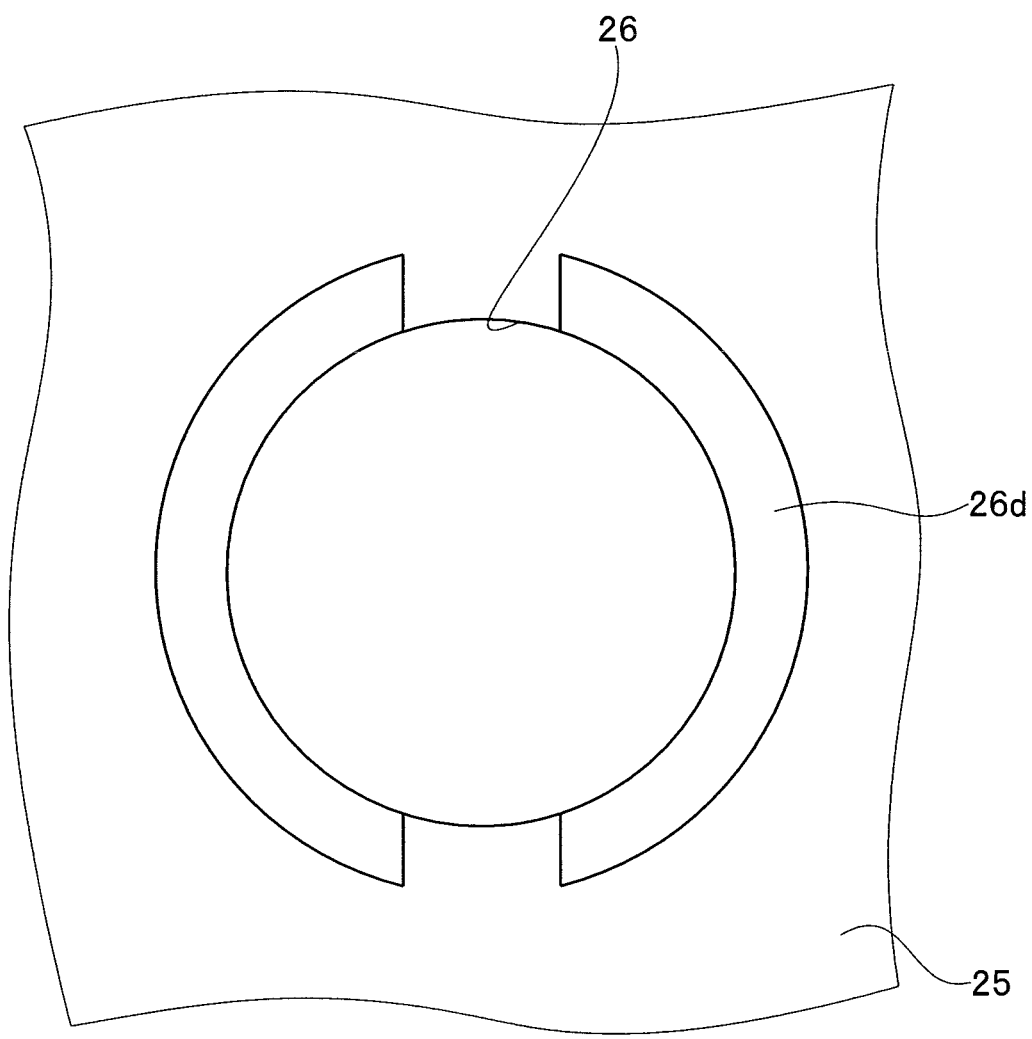
FIG. 21 relates to a first modification and is a plan view showing a modification of the shape of the projection formed around the opening of the first hole.

FIG. 21 is a plan view showing a modification of the shape of the projection formed around the opening of the first hole. As shown in FIG. 21, the first tongue piece portion 25 includes two arcuate projections 26d formed in the same shape. The projections 26d are disposed in positions opposed to each other around the first hole 26. By forming the discontinuous projections 26d in this way, it is possible to reduce a contact area between the first tongue piece portion 25 and the second tongue piece portion 33 compared with the annular projection 26c explained above. Therefore, the projections 26d can further reduce the sliding resistance between the tubular members.

Figure 22:
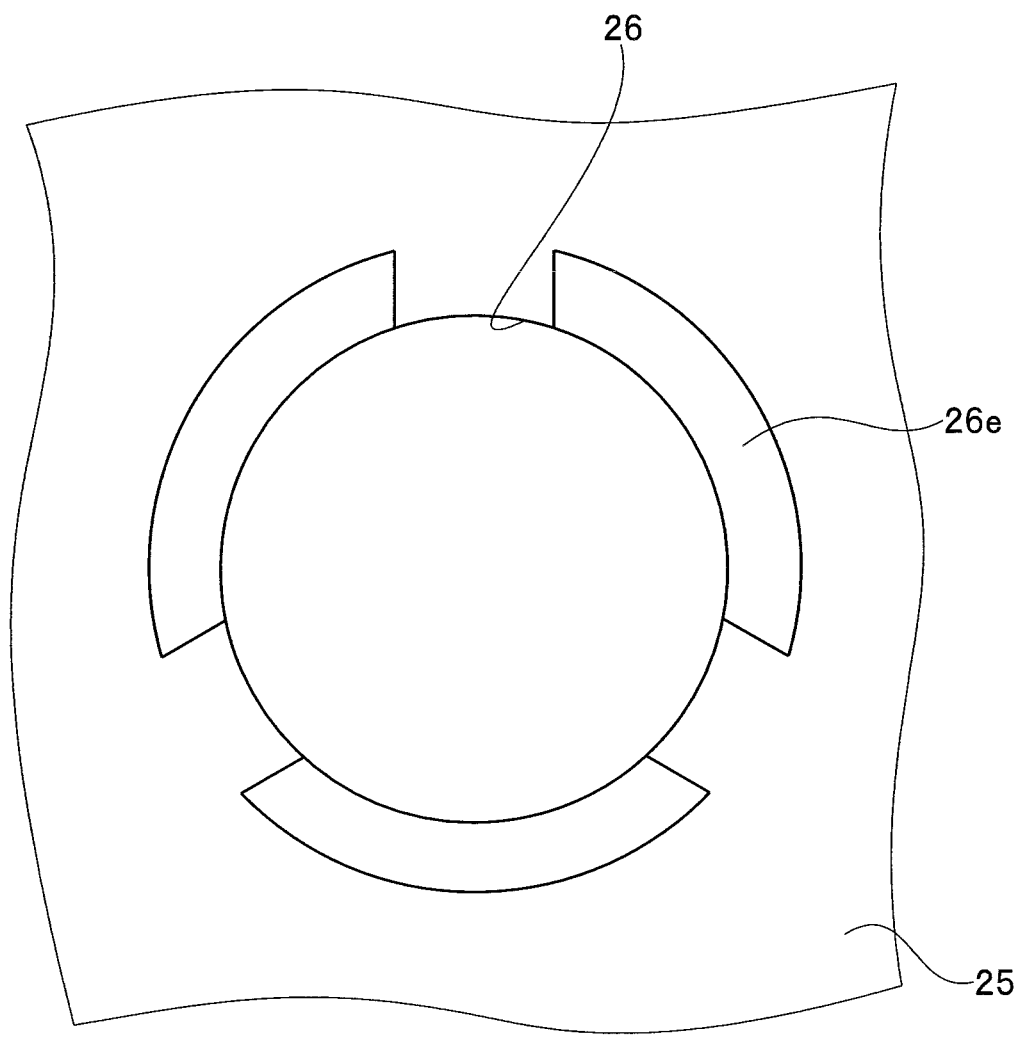
FIG. 22 relates to a second modification and is a plan view showing a modification of the shape of the projection formed around the opening of the first hole.

FIG. 22 is a plan view showing a modification of the shape of the projection formed around the opening of the first hole. As shown in FIG. 22, the first tongue piece portion 25 includes three arcuate projections 26e formed in the same shape. The projections 26e are annularly disposed at every equal interval around the first hole 26. By forming the discontinuous projections 26e in this way, it is possible to reduce the contact area between the first tongue piece portion 25 and the second tongue piece portion 33 compared with the projections 26d explained above. Therefore, the projections 26e can further reduce the sliding resistance between the tubular members.

Figure 23:
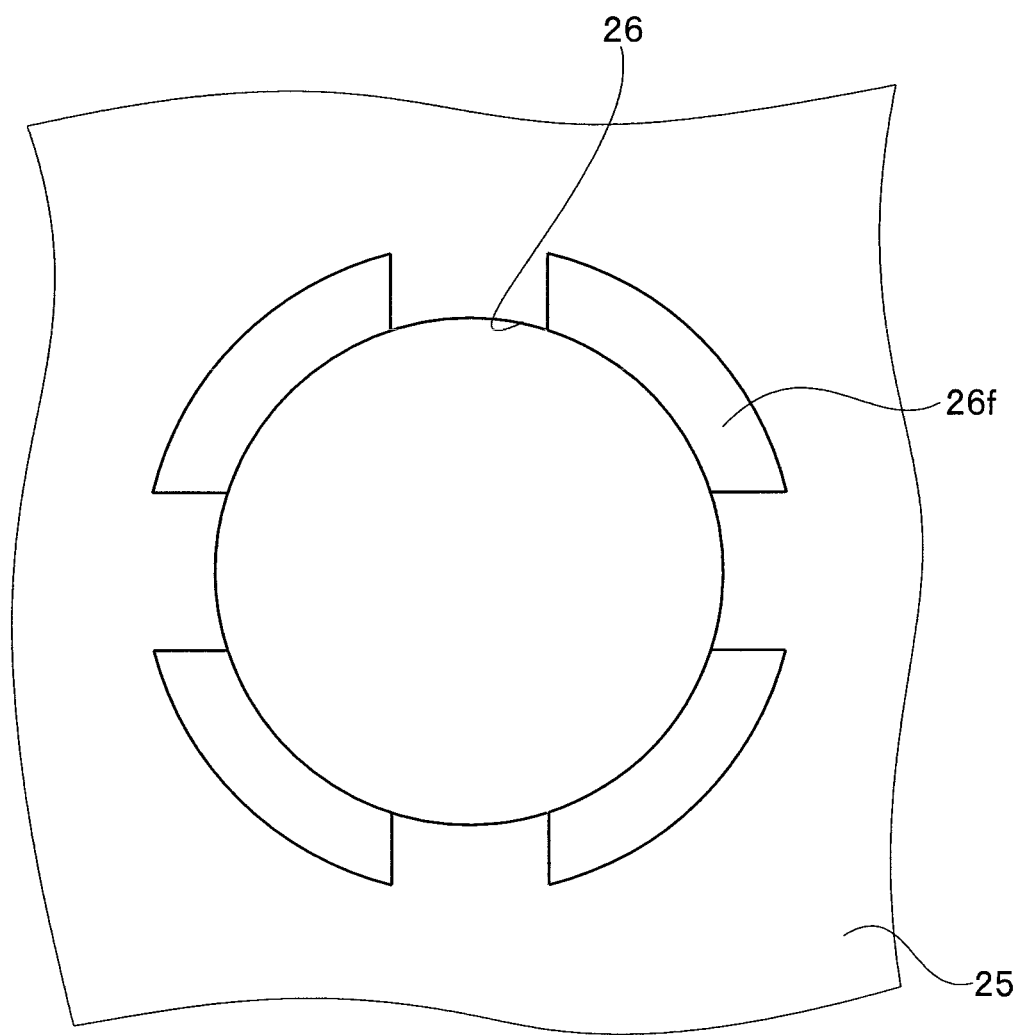
FIG. 23 relates to a third modification and is a plan view showing a modification of the shape of the projection formed around the opening of the first hole.

FIG. 23 is a plan view showing a modification of the shape of the projection formed around the opening of the first hole. As shown in FIG. 23, the first tongue piece portion 25 includes four arcuate projections 26f formed in the same shape. The projections 26f are annularly disposed at every equal interval around the first hole 26. By forming the discontinuous projections 26f in this way, it is possible to reduce the contact area between the first tongue piece portion 25 and the second tongue piece portion 33 compared with the projections 26e explained above. Therefore, the projections 26f can further reduce the sliding resistance between the tubular members.

Figure 24:
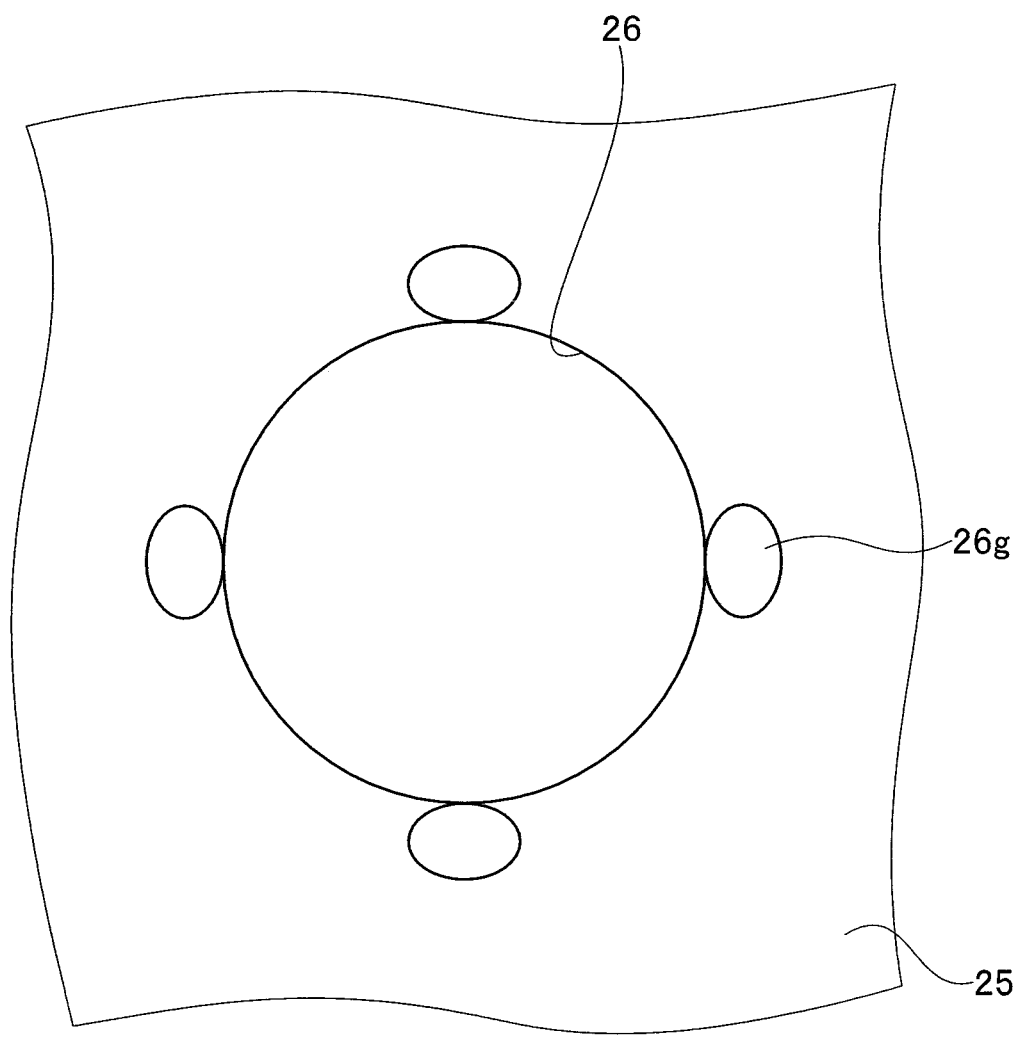
FIG. 24 relates to a fourth modification and is a plan view showing a modification of the shape of the projection formed around the opening of the first hole.

FIG. 24 is a plan view showing a modification of the shape of the projection formed around the opening of the first hole. As shown in FIG. 24, the first tongue piece portion 25 includes four elliptical projections 26g formed in the same shape. The projections 26g are annularly disposed at every equal interval around the first hole 26. By forming the discontinuous projections 26g in this way, it is possible to reduce the contact area between the first tongue piece portion 25 and the second tongue piece portion 33 compared with the projections 26e explained above. Therefore, the projections 26g can further reduce the sliding resistance between the tubular members.

Figure 25:
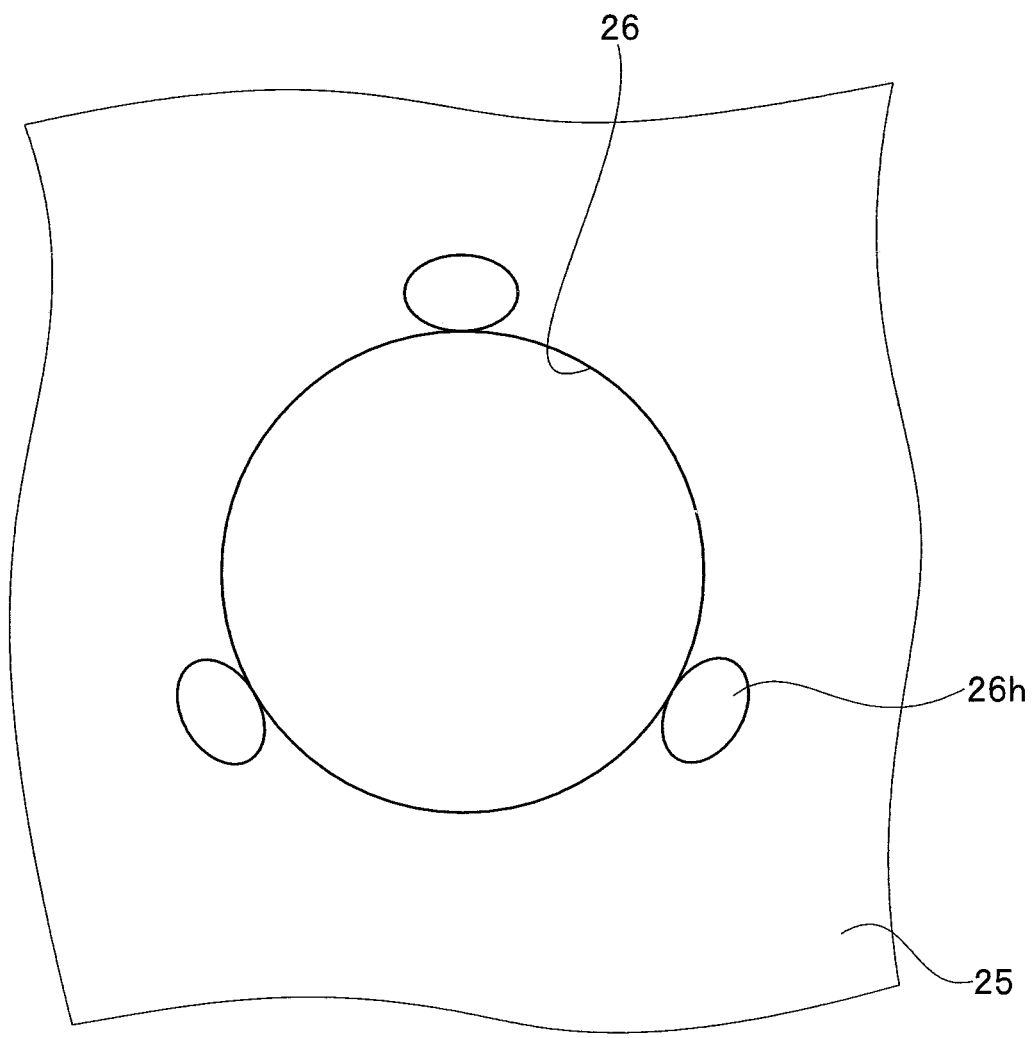
FIG. 25 relates to a fifth modification and is a plan view showing a modification of the shape of the projection formed around the opening of the first hole.

FIG. 25 is a plan view showing a modification of the shape of the projection formed around the opening of the first hole. As shown in FIG. 25, the first tongue piece portion 25 includes three elliptical projections 26h formed in the same shape. The projections 26h are annularly disposed at every equal interval around the first hole 26. By forming the discontinuous projections 26h in this way, it is possible to reduce the contact area between the first tongue piece portion 25 and the second tongue piece portion 33 compared with the projections 26e explained above. Therefore, the projections 26h can further reduce the sliding resistance between the tubular members.

Note that the projections 26 can form protrusions having various shapes by changing pressing conditions such as thickness of the first plate material 51, a distal end shape of the punching punch 37, and a press load. Protrusions having various shapes can also be formed by combinations of a shape of the recess 41a and the pressing conditions.

The disclosures described in the embodiment explained above are not limited to the embodiment. Besides, in an implementation stage, various modifications can be implemented in a range not departing from the gist of the disclosure. Further, disclosures in various stages are included in the embodiment. Various disclosures can be extracted by appropriate combinations in a disclosed plurality of constituent elements.

When the described problems can be solved and the described effects can be obtained even if several constituent elements are deleted from all the constituent elements described in the embodiment explained above, a configuration in which the constituent elements are deleted can be extracted as a disclosure.

What is claimed is:

1. A bending tube for an endoscope, comprising:
    a first tubular member including a first tubular opening extending in an axial direction of the first tubular member from a first tubular end to a second tubular end; and
    a second tubular member including a second tubular opening extending in an axial direction of the second tubular member from a first tubular end to a second tubular end,
    wherein the first tubular member includes a first end portion, a first hole extending through the first end portion in a radial direction of the first tubular member, and a projection on a surface of the first end portion around a periphery of a first end of the first hole,
    wherein the second tubular member includes a second end portion, a second hole extending through the second end portion in a radial direction of the second tubular member, and a turning shaft projecting from a periphery of a first end of the second hole,
    wherein the first end portion overlaps the second end portion and the turning shaft is seated in the first hole to connect the first tubular member to the second tubular member, and
    wherein, with the turning shaft seated in the first hole:
    the first tubular member is turnable relative to the second tubular member about a shaft axis of the turning shaft, and
    the projection on the surface of the first end portion contacts a surface of the second end portion.

2. The bending tube according to claim 1, wherein the turning shaft has a base end connected to the second end portion and a distal end of the turning shaft,
    wherein an outer circumference surface of the distal end of the turning shaft has a first outer diameter, and
    wherein the first outer diameter is larger than an inner diameter of the first hole.

3. The bending tube according to claim 1, wherein a periphery of a radially outer end of the first hole has a first chamfered surface,
    wherein an outer circumference surface of the distal end of the turning shaft has a second chamfered surface, and
    wherein, with the turning shaft seated in the first hole, the first chamfered surface slidably contacts the second chamfered surface.

4. The bending tube according to claim 3, wherein the first chamfered surface has a shape of a truncated cone.

5. The bending tube according to claim 1, wherein the first end portion is radially outward from the second end portion,
    wherein the first end of the first hole is a radially inner end of the first hole, and
    wherein the first end of the second hole is a radially outer end of the second hole.

6. The bending tube of the endoscope according to claim 1, wherein the turning shaft has an annular shape.

7. An endoscope, comprising:
    a bendable bending portion in an insertion section,
    wherein the bending portion includes the bending tube according to claim 1.

8. The endoscope according to claim 7, wherein the turning shaft has a base end connected to the second end portion and a distal end,
- wherein an outer circumference surface of the distal end of the turning shaft has a first outer diameter, and
- wherein the first outer diameter is larger than an inner diameter of the first hole.

9. The endoscope according to claim 8, wherein the turning shaft has an annular shape.

10. The endoscope according to claim 7, wherein a periphery of a radially outer end of the first hole has a first chamfered surface,
- wherein an outer circumference surface of the distal end of the turning shaft has a second chamfered surface, and
- wherein, with the turning shaft seated in the first hole, the first chamfered surface slidably contacts the second chamfered surface.

11. The endoscope according to claim 10, wherein the first chamfered surface has a shape of a truncated cone.

12. The endoscope according to claim 7, wherein the first end portion is radially outward from the second end portion,
- wherein the first end of the first hole is a radially inner end of the first hole, and
- wherein the first end of the second hole is a radially outer end of the second hole.

13. The endoscope according to claim 7, wherein the first end portion is radially inward from the second end portion,
- wherein the first end of the first hole is a radially outer end of the first hole, and
- wherein the first end of the second hole is a radially inner end of the second hole.

14. A manufacturing method for a bending tube of an endoscope, comprising:
- forming, in a first plate material, a first hole having an inner diameter;
- forming, on a first surface of the first plate material, a projection around a periphery of a first end of the first hole;
- forming, in a second plate material, a turning shaft configured to be insertable into the first hole, wherein the turning shaft includes a second hole extending through the turning shaft in an axial direction of the turning shaft;
- inserting the turning shaft into the first hole;
- working a distal end portion of the turning shaft to increase an outer diameter of the distal end portion to be larger than the inner diameter of the first hole; and
- forming the first plate material into a first tubular member and forming the second plate material into a second tubular member.

15. The manufacturing method according to claim 14, wherein forming the first plate material into the first tubular member includes bending the first plate material and bonding ends of the first plate material, and
- wherein forming the second plate material into the second tubular member includes bending the second plate material and bonding ends of the second plate material.

16. The manufacturing method according to claim 14, further comprising bending the projection to face an inner circumference surface of the tubular member.

17. The manufacturing method according to claim 14, further comprising bending the projection to face an outer circumference surface of the tubular member.

* * * * *